(12) United States Patent
Kim et al.

(10) Patent No.: US 6,215,610 B1
(45) Date of Patent: Apr. 10, 2001

(54) RECORDING/REPRODUCING APPARATUS WITH SINGLE MOTOR FOR OPERATING TAPE LOADING MECHANISM, PINCH ROLLER DRIVING MECHANISM, REEL DRIVING MECHANISM, BRAKE MECHANISM, AND MODE IDENTIFYING MECHANISM

(75) Inventors: Ki-hong Kim; Myoung-soo Choi; Ki-won Yang; Jong-woo Kim; Byung-sam Son; Myoung-sub Jang, all of Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/437,235

(22) Filed: Nov. 10, 1999

Related U.S. Application Data

(62) Division of application No. 09/182,877, filed on Oct. 30, 1998, now abandoned, which is a division of application No. 08/630,606, filed on Apr. 10, 1996, now Pat. No. 5,859,744.

(30) Foreign Application Priority Data

Apr. 13, 1995 (KR) .................................... 95-8711

(51) Int. Cl.[7] ................................................. G11B 5/027
(52) U.S. Cl. ............................................................. 360/85
(58) Field of Search ................................... 360/60, 85, 95

(56) References Cited

U.S. PATENT DOCUMENTS

| | | | |
|---|---|---|---|
| 4,628,383 | 12/1986 | Miyamoto | 360/96.5 |
| 5,180,117 | 1/1993 | Katohno et al. | 360/95 X |
| 5,475,541 * | 12/1995 | Kim | 360/60 |
| 5,486,958 | 1/1996 | Choi et al. | 360/85 |
| 5,572,381 | 11/1996 | Stewart | 360/85 |
| 5,600,508 | 2/1997 | Choi | 360/96.5 |
| 5,608,589 | 3/1997 | Kang et al. | 360/85 |
| 5,619,388 | 4/1997 | Kawai | 360/85 |
| 5,748,402 | 5/1998 | Choi | 360/85 |
| 5,859,744 * | 1/1999 | Kim et al. | 360/85 |
| 5,940,236 * | 8/1999 | Lee | 360/60 X |

* cited by examiner

Primary Examiner—William Klimowicz
(74) Attorney, Agent, or Firm—Sughrue, Mion, Zinn, Macpeak & Seas, PLLC

(57) ABSTRACT

A magnetic recording/reproducing apparatus whereby the movements of various parts of a deck are fast and a very stabilized operation is attained. The apparatus includes a deck having a rotating head drum, a capstan motor and a pinch roller disposed adjacent to the head drum, and two reel driving tables onto which a tape reel of a tape cassette is seated. A motor is installed in the deck for generating power. A cassette loading device is provided for loading/unloading the tape cassette onto/from the reel driving tables. A master gear member rotated by the motor, a main slide member having a rack gear connected to the master gear member, a tape loading device interlocked with the main slide member for loading a tape of the tape cassette toward the head drum, a pinch roller driving device interlocked with the main slide member and pressed/separated against/from a shaft of the capstan motor for driving the pinch roller so that the tape is pressingly transferred are provided. A reel driving device is interlocked with the main slide member for selectively driving the two reel driving tables. A brake device is interlocked with the main slide member for selectively braking the two reel driving tables, and a mode identifying device is interlocked with the cassette loading device for determining the recording feasibility of the tape.

2 Claims, 34 Drawing Sheets

RECORDING/REPRODUCING APPARATUS WITH SINGLE MOTOR FOR OPERATING TAPE LOADING MECHANISM, PINCH ROLLER DRIVING MECHANISM, REEL DRIVING MECHANISM, BRAKE MECHANISM, AND MODE IDENTIFYING MECHANISM

This is a divisional of application Ser. No. 09/182,877 filed Oct. 30, 1998, now abandoned, which is a divisional of application Ser. No. 08/630,606 filed Apr. 10, 1996, now U.S. Pat. No. 5,859,744, the disclosure of which is incorporated herein by reference.

BACKGROUND OF THE INVENTION

The present invention relates to a magnetic recording/reproducing apparatus and, more particularly, to a magnetic recording/reproducing apparatus for performing a recording/reproducing operation of information by loading a tape cassette onto a reel driving table, winding the tape around a rotary drum at a predetermined winding angle and traveling or moving the tape with a capstan and a pinch roller. In particular, the present invention relates to a magnetic recording/reproducing apparatus comprising a master gear rotated more than one revolution, a slide member interlocking with the master gear, and a switch provided around the slide member, so that the operation mode of the apparatus is selected according to the movement of the slide member.

Deck mechanisms for performing a recording/reproducing operation for a magnetic tape with a rotary head drum are employed in video cassette tape recorders (VCRs), camcorders, and digital audio tape (DAT) recorders. Deck mechanisms installed in such devices are equipped with a cassette loading device for carrying a cassette to a predetermined position of the deck, two reel driving tables on which two tape reels of the carried cassette are seated, for selectively driving one of the two tape reels, a brake for selectively braking the two reel driving tables, a tape loading device for loading a tape onto a head drum, a tension pole device for maintaining tension of the tape by applying pressure to the loaded tape, pinch roller driving means for pressing the tape between a capstan and a pinch roller, and at least one guiding means for guiding the traveling tape.

Such a deck mechanism executes various functions such as basic recording/playback and fast forward winding/rewinding, or functions such as reproduction, fast search or reverse reproduction of a still picture or slow-mode picture, according to a conventional control program.

In order to simplify the structure of the deck mechanism and stabilize the operation thereof, it is necessary to improve the driving relationship of various parts of the deck.

Typically, the cassette loading device and the deck are driven by separate motors, and move independently of the various parts of the deck. Thus, the system is very complicated and the productivity thereof is low at a high cost.

To overcome such problems, Korean Patent Publication No. 93-8495 discloses a cassette loading device and deck which are driven with a single motor. Also, a cam gear having a plurality of spiral cam grooves for transmitting power to various parts of the deck is used therein. However, in this device, since interlocking pins of the various parts are inserted into and moved along the plurality of cam grooves formed in the cam gear, mode conversion is not fast. Moreover, the interlocking pins are easily detached from the cam grooves, which frequently causes malfunction. Also, intermediate components for connecting various parts of the deck with the cam gear must be added, which impedes the attainment of a simplified device and reduced costs.

SUMMARY OF THE INVENTION

In consideration of the aforementioned related art, it is an object of the present invention to provide an improved magnetic recording/reproducing apparatus whose structure is simplified and whereby the movements of various parts of a deck are fast and operation is stabilized.

To accomplish the above object, a magnetic recording/reproducing apparatus according to the present invention comprises: a deck including a rotating head drum, a capstan motor having a shaft and a pinch roller disposed adjacent to the head drum, and two reel driving tables onto which a tape reel of a tape cassette is seated; a motor installed in the deck for generating power; cassette loading means for loading/unloading the tape cassette onto/from the two reel driving tables; a master gear member rotated by the motor; a main slide member having a rack gear engaged with the master gear member; tape loading means, interlocked with the main slide member, for loading a tape of the tape cassette toward the head drum; pinch roller driving means, interlocking with the main slide member and either pressed against or separated from the shaft of the capstan motor, for driving said pinch roller so that the tape is pressingly transferred; reel driving means, interlocked with the main slide member, for selectively driving the two reel driving tables; brake means, interlocked with the main slide member, for selectively braking the two reel driving tables; and mode identifying means, interlocked with the cassette loading means, for determining the recording feasibility of the tape.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
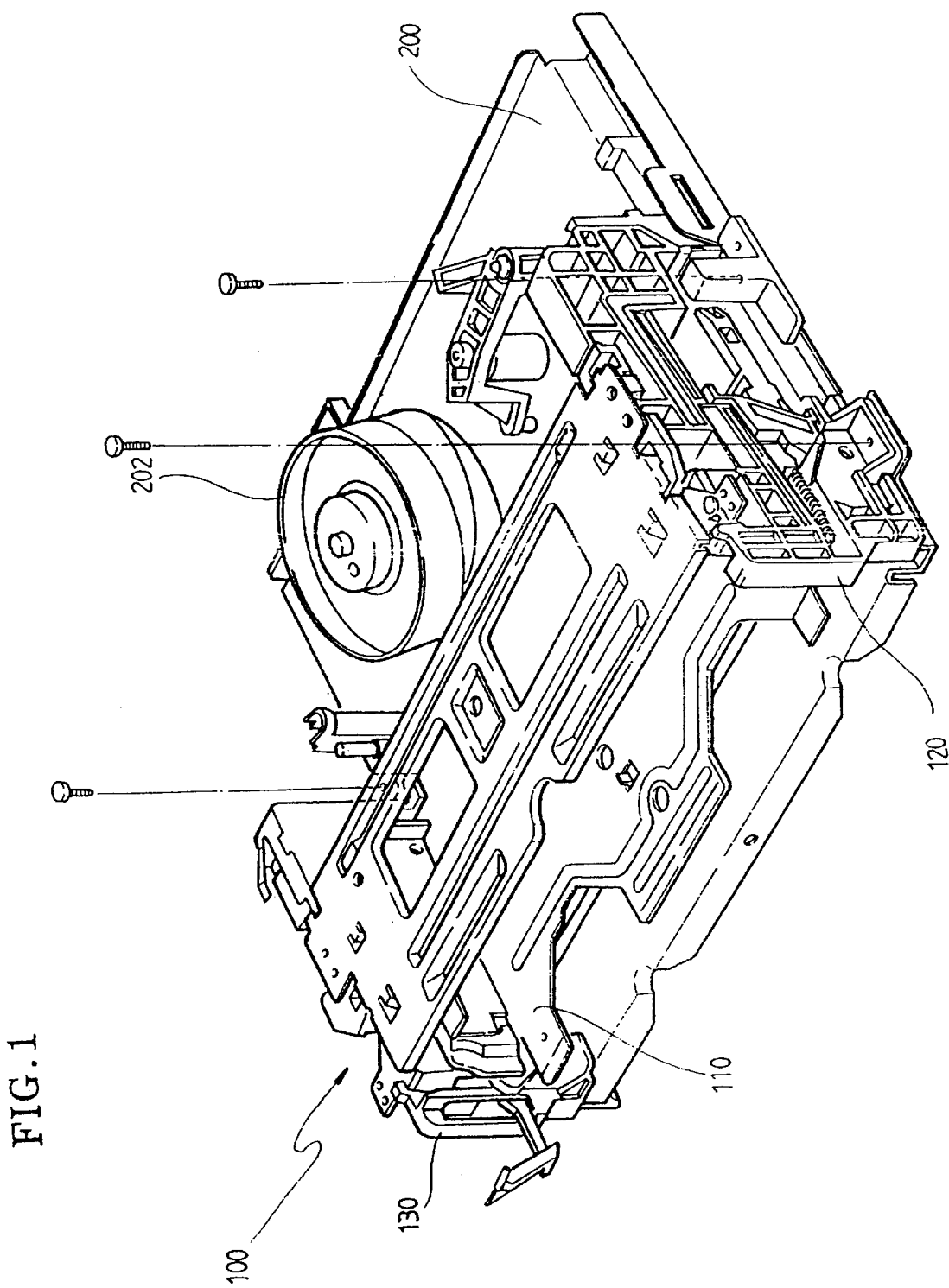
FIG. 1 is a perspective view illustrating a magnetic recording/reproducing apparatus according to the present invention in a state where a housing is assembled on a deck.

Referring to FIGS. 1 through 4, reference numeral 200 denotes a deck and reference numeral 100 denotes a tape cassette housing installed on deck 200 for accepting a tape cassette and loading/unloading the tape cassette. A head drum 202 having a magnetic head 201 (see FIG. 3) is installed on the deck 200 so as to be rotated by a drum motor 203. A capstan motor 204 is installed beneath the deck 200 and a capstan motor shaft 205 is projected upwardly onto the deck 200 from the capstan motor 204. A pinch roller 206, which is either pressed against or separated from the capstan motor shaft 205 by means of a predetermined driving means, is provided beside the capstan motor shaft 205.

Figure 11:
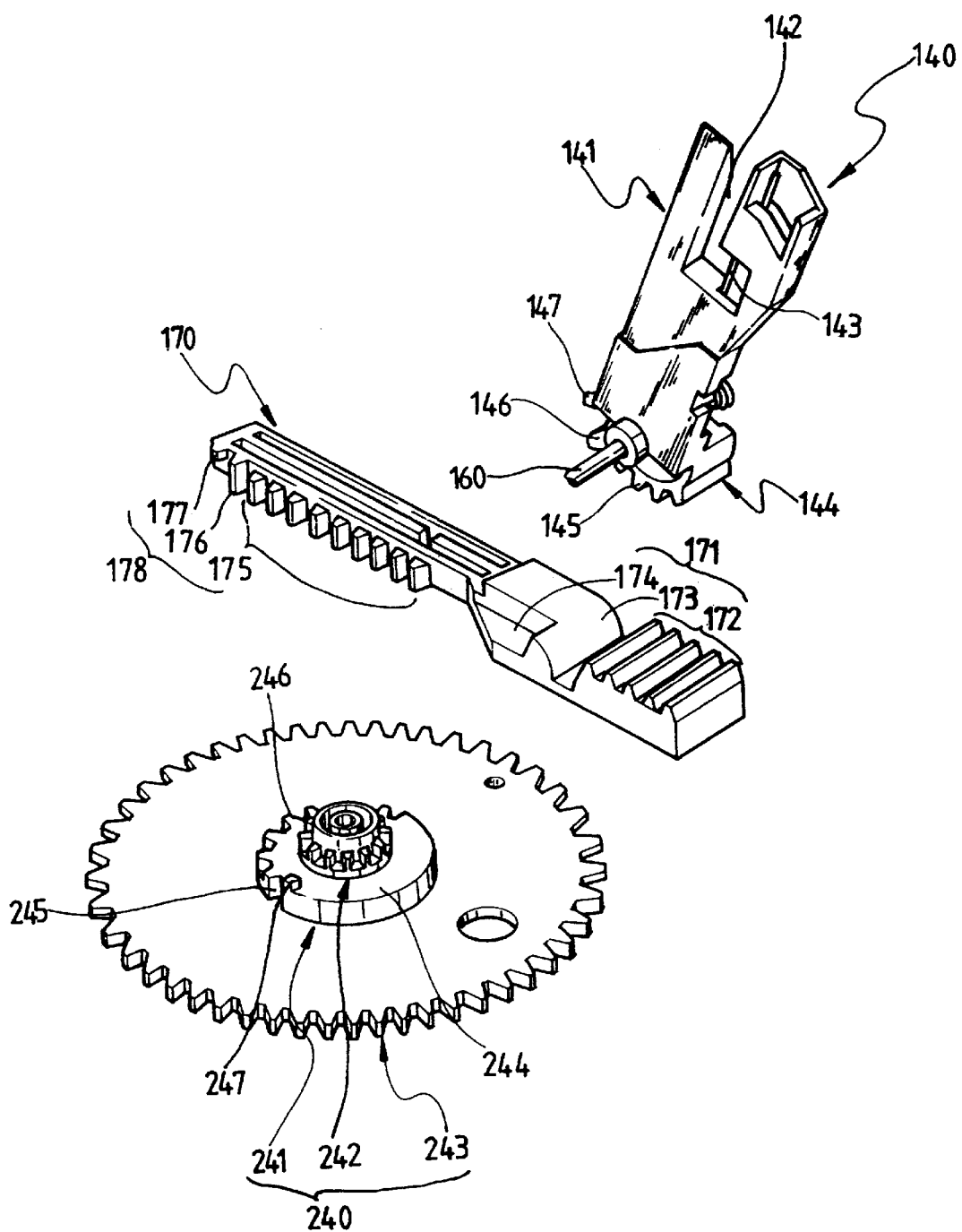
FIGS. 11 through 16 are views illustrating the interconnections of a master gear member, a slide member and a first arm gear member during loading of the tape cassette.

A motor 230 for generating power, a master gear member 240 connected to the motor 230 via a worm 231 and a worm gear 232, and a main slide member 250 having a rack gear 251 connected to the master gear member 240, are arranged beneath the deck 200. The main slide member 250 is installed to move toward/away from the master gear member 240. Referring now to FIG. 11, the master gear member 240 is formed with a large gear portion 243, a small gear portion 241 and a pinion 242, which are concentrically arranged. Large gear portion 243 engages with the worm gear 232, and the pinion 242 engages with the rack gear 251 of the main slide member 250 (see FIG. 17).

Meanwhile, tape cassette loading means for seating/ejecting a tape cassette onto/from two reel driving tables 210 and 220 is provided. Also, there are provided tape loading means for extracting the tape from the tape cassette seated on two reel driving tables 210 and 220 and loading the same to the head drum 202, reel driving means interlocked with the main slide member 250 for selectively driving the two reel driving tables 210 and 220, a brake interlocked with the main slide member 250 for selectively braking the two reel driving tables, and mode identifying means interlocked with the cassette loading means for determining the recording feasibility of the tape.

The configuration of tape cassette loading means for seating/ejecting the tape cassette onto/from the two reel driving tables 210 and 220 will now be described.

Figure 2:
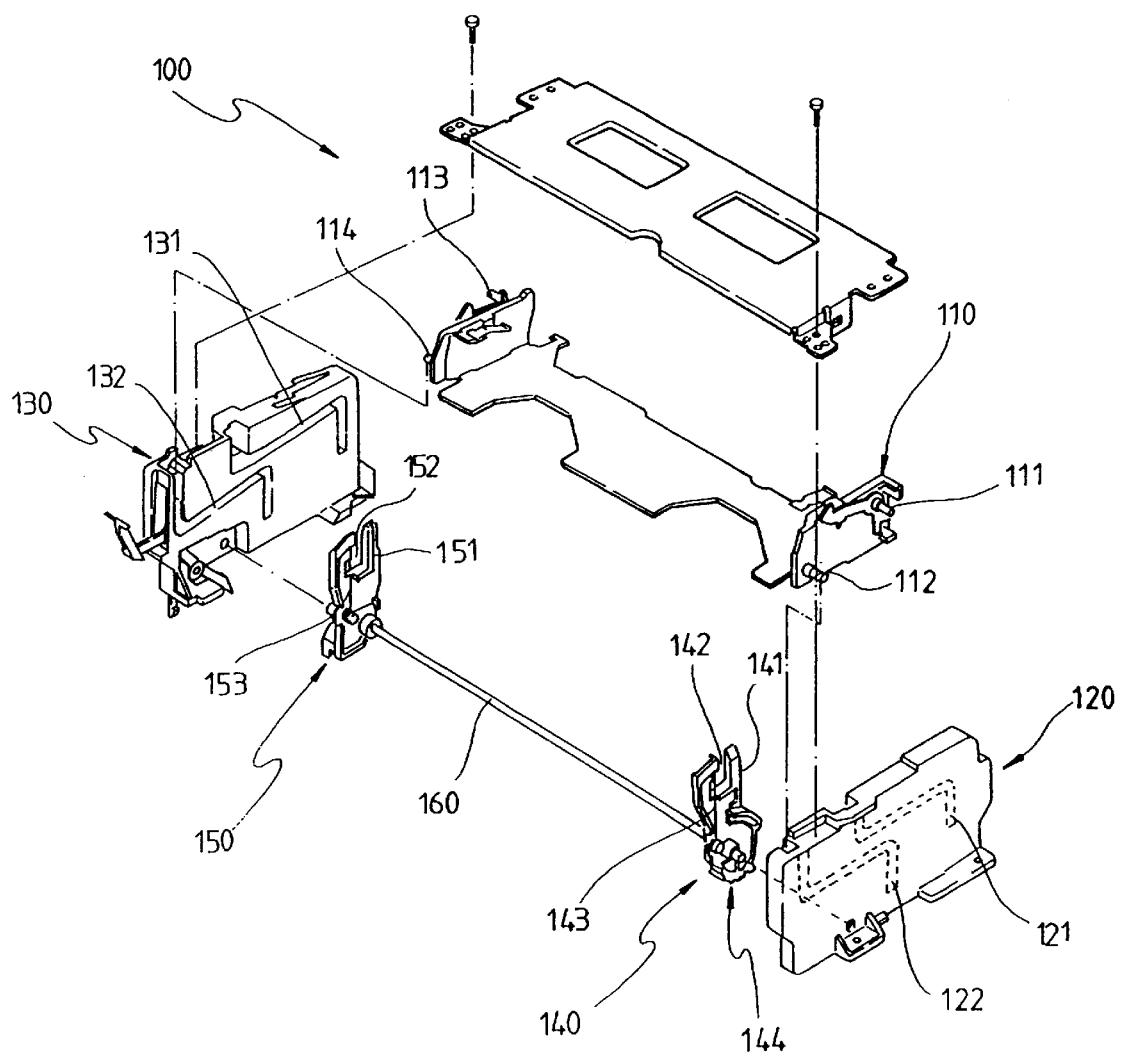
FIG. 2 is an exploded perspective view illustrating the housing shown in FIG. 1.

First, referring to FIG. 2, the cassette tape housing 100 includes a holder 110 for receiving the tape cassette, and first and second guide brackets 120 and 130 fixed on the deck 200 for guiding the holder 110 so as to be movable horizontally and vertically with respect to the deck plane. Guide pins 111 through 114 are formed on the sides of the holder 110, two on each side. Guiding slots 121, 122, 131 and 132 into which guide pins 111 through 114 are respectively inserted are formed on the first and second guide brackets 120 and 130, two slots on each bracket. Guiding slots 121, 122, 131 and 132 each have horizontal portions and vertical portions so as to guide holder 110 horizontally and vertically.

First and second arm members 140 and 150 having arms 141 and 151, respectively, are rotatably installed between the first and second guide brackets 120 and 130. First and second arm members 140 and 150 are coupled with each other by a shaft 160 and rotate together centering on the shaft 160. Guide slots 142 and 152 into which the guide pins 112 and 114 of the holder 110 are slidably inserted are provided in the arms 141 and 151 of the first and second arm members 140 and 150, respectively. Torsion springs 143 and 153 in an elastic contact with the guide pins 112 and 114 are installed in the first and second arm members 140 and 150, respectively.

Meanwhile, referring to FIGS. 2 and 11, a cam gear 144 is formed in the first arm member 140. Cam gear 144 is structured such that gear teeth 145, a cam projection 146 and a control tooth 147 are sequentially formed. The entire length of the cam projection 146 is about two times greater than that of each of the gear teeth 145.

Figure 3:
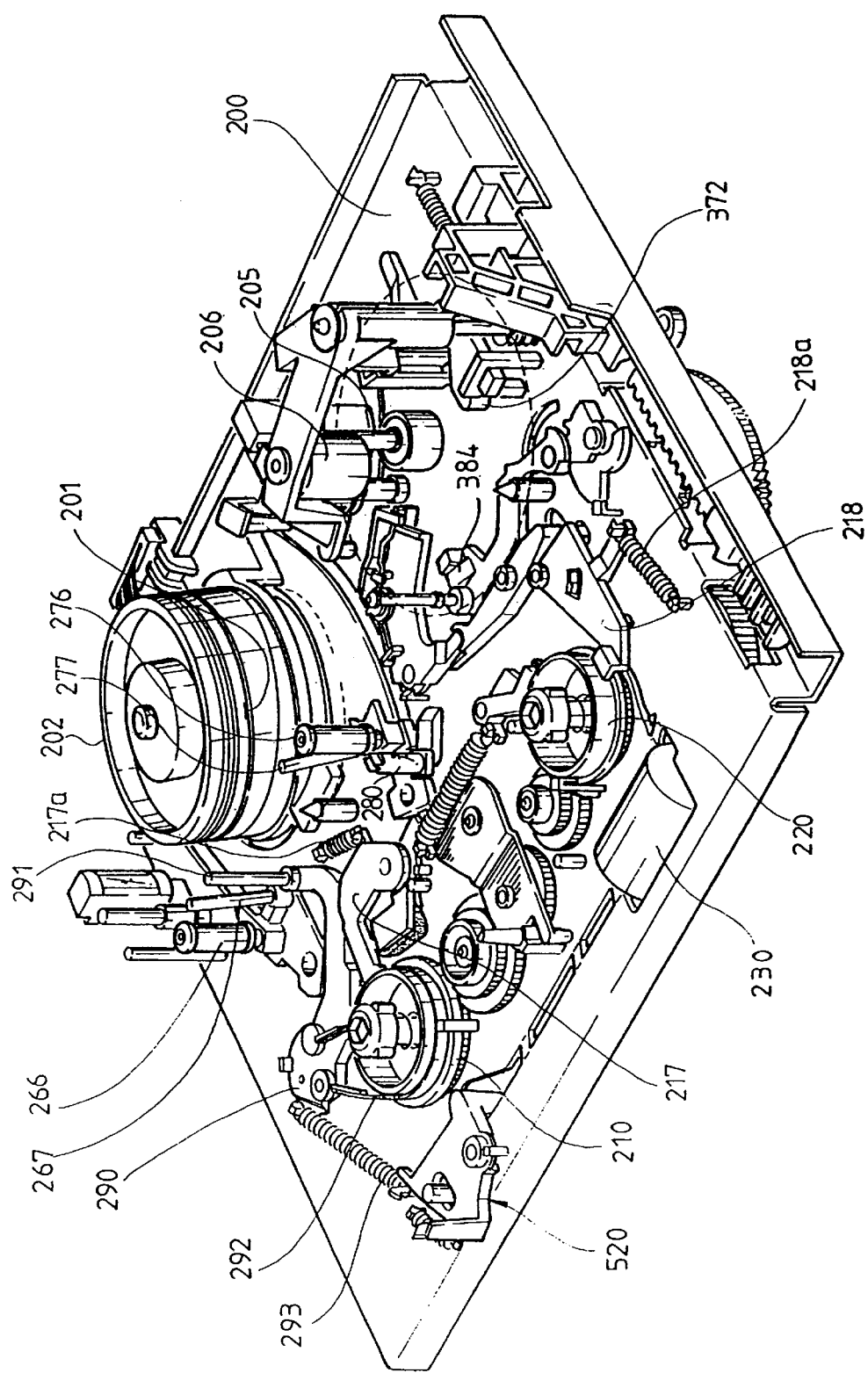
FIG. 3 is a perspective view illustrating the deck shown in FIG. 1 with the housing removed.

Also, referring to FIGS. 3 and 11, on one side of the deck 200 is movably installed a slide member 170 having a first rack gear 171 which meshes with the cam gear 144 and a second rack gear 178 which meshes with the small gear portion 241 of the master gear member 240.

First rack gear 171 is formed on an upper surface of the slide member 170 and second rack gear 178 is formed in one side wall of the slide member 170. First rack gear 171 includes a rack 172 which meshes with the gear teeth 145 of the first arm member 140, a cam 173 which contacts with the cam projection 146 and a control tooth groove 174 which engages with the control tooth 147. The torsion spring 143 and cam projection 146 of the first arm member 140, and the cam 173 of the first rack gear 171 are for pressing the tape cassette at a cassette loading termination point. Control tooth 147 of the first arm member 140 and control tooth groove 174 of the slide member 170 allow smooth gear connection and driving of the cam gear 144 of the first arm member 140 and the first rack gear 171 of the slide member 170 at the initial stage of the eject operation of the tape cassette.

In the aforementioned tape cassette loading means, if the master gear member 240 is rotated clockwise by motor 230, the slide member 170 and first and second arm members 140 and 150 interlock with each other to then move holder 110. At this time, the tape cassette is seated onto or ejected from the reel driving tables 210 and 220 in accordance with the rotation direction of the master gear member 240.

Meanwhile, there is provided a racing means for racing the master gear member 240 so that the holder 110 is not moved when the tape cassette loading means is moved by the rotation of the master gear member 240 after the tape cassette is seated on the reel driving tables 210 and 220 by the tape cassette loading means.

The configuration of the racing means will now be described with reference to FIG. 11.

Second rack gear 178 of slide member 170 is structured such that a rack 175, an extended tooth 176 and a control tooth 177 are sequentially formed. The face width of the extended tooth 176 is about two times larger than that of each tooth of the rack 175. As shown, the rack 175 is formed on the lower portion of the side wall of slide member 170 and control tooth 177 is formed on the upper portion thereof.

Small gear portion 241 of the master gear member 240 has a gear 246 and a cam 244 on its outer circumference. Gear 246 has an extended tooth groove 245 corresponding to the extended tooth 176 of slide member 170 and a control projection 247 corresponding to control tooth 177. Control projection 247 is formed on the small gear portion 241. The extended tooth groove 245 and control protrusion 247 of the master gear member 240 and the extended tooth 176 and control tooth 177 of the slide member 170 are provided for making a smooth gear connection and driving between the gear 246 and the second rack gear 178 at the initial stage of the tape cassette ejection. Gear 246 meshes with the rack 175 of slide member 170, and the cam 244 is raced with respect to the control tooth 177.

Figure 16:
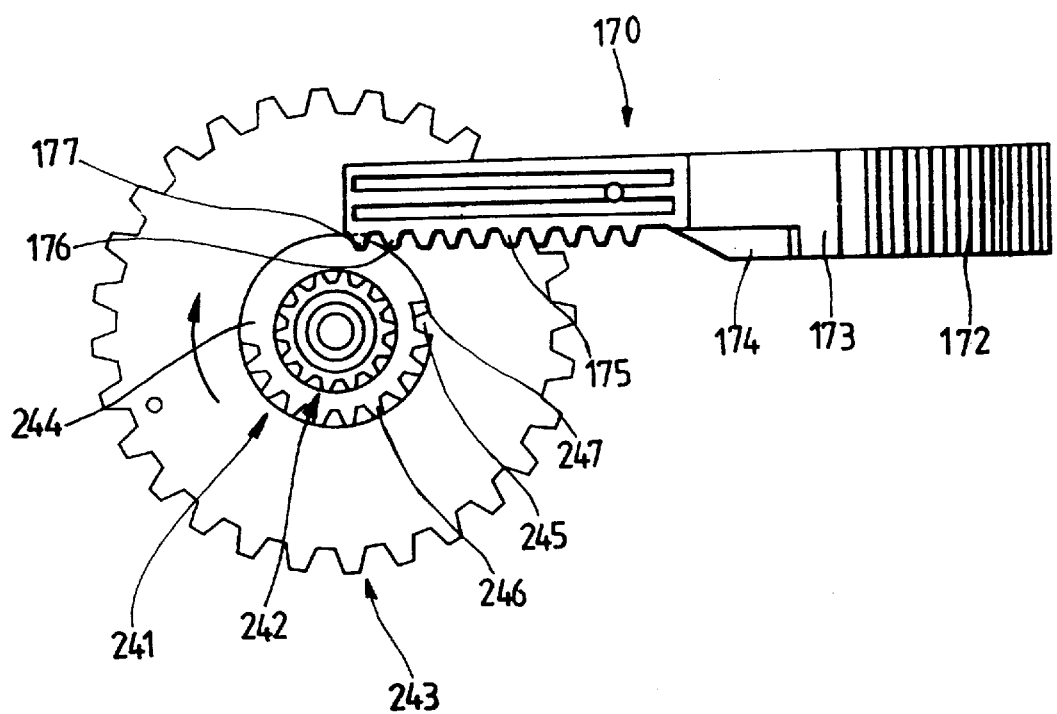

In the aforementioned racing means, referring to FIG. 16, after the tape cassette is completely loaded, the cam 244 of the master gear member 240 corresponds to the control tooth 177 of slide member 170. Therefore, the slide member 170 does not interlock with the master gear member 240 but maintains a stationary state. As a result, after the tape cassette is seated on the reel driving tables 210 and 220, even if the master gear member 240 operates in other modes, the tape cassette remains stably in place.

Figure 5:
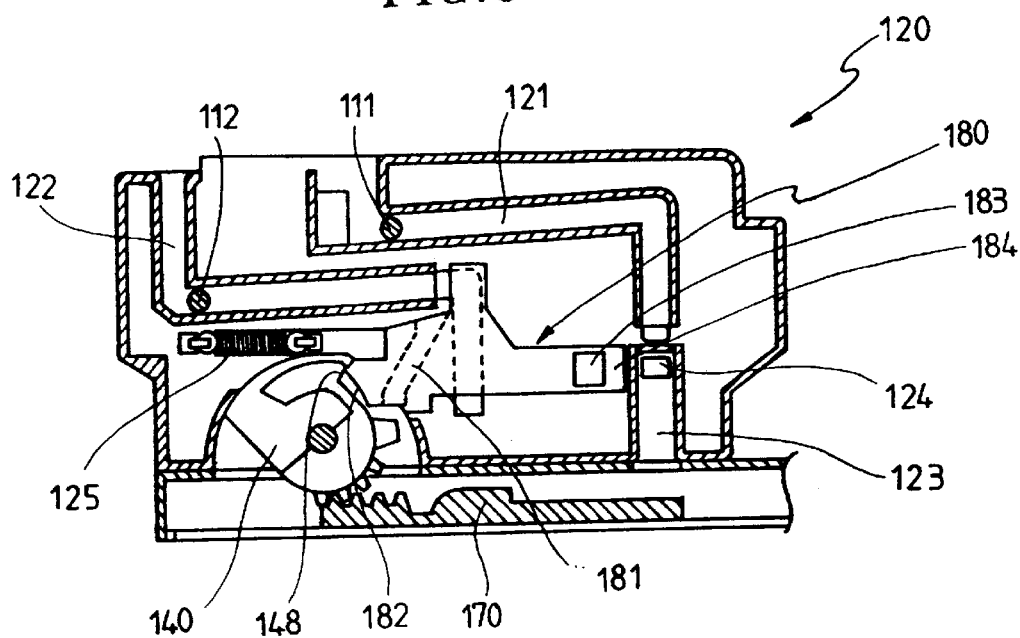
FIGS. 5 through 10 are cross-sectional views of the housing schematically illustrating the operational states of first and second shutter members when a tape cassette is loaded.
Figure 6:
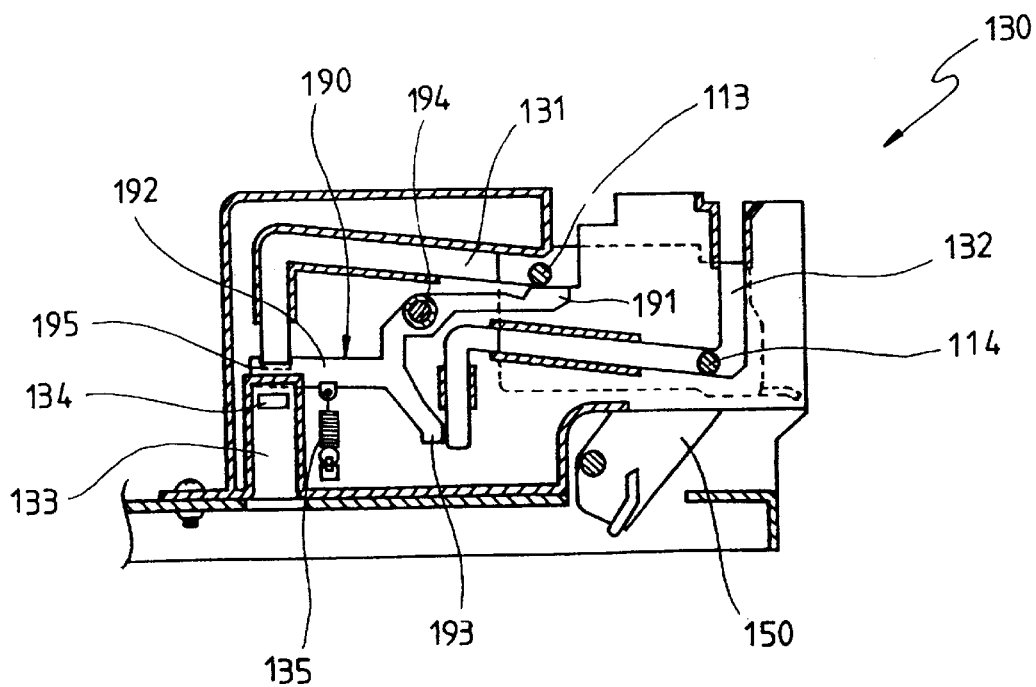
Figure 7:
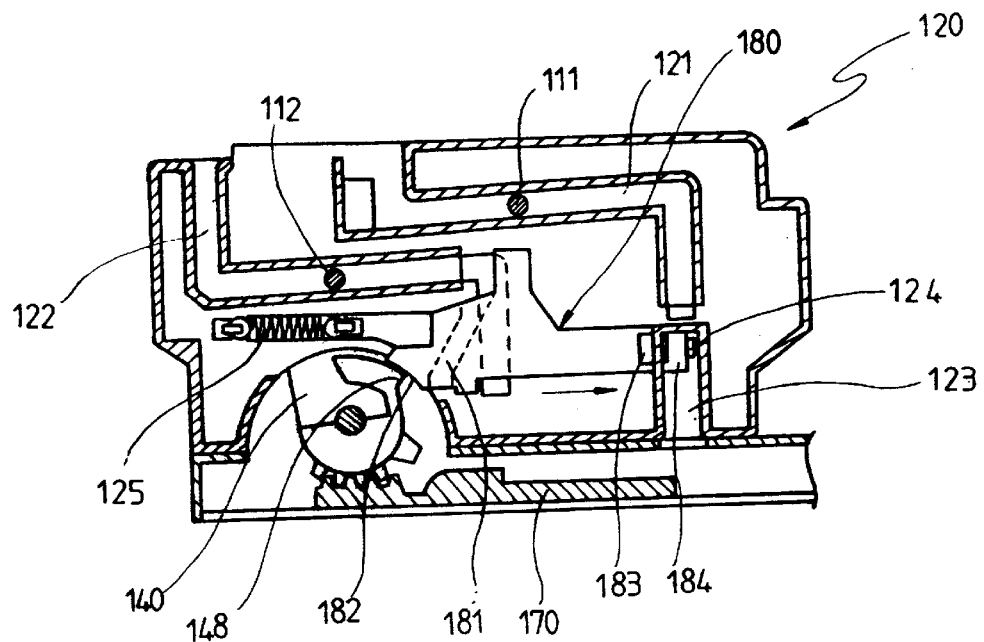
Figure 8:
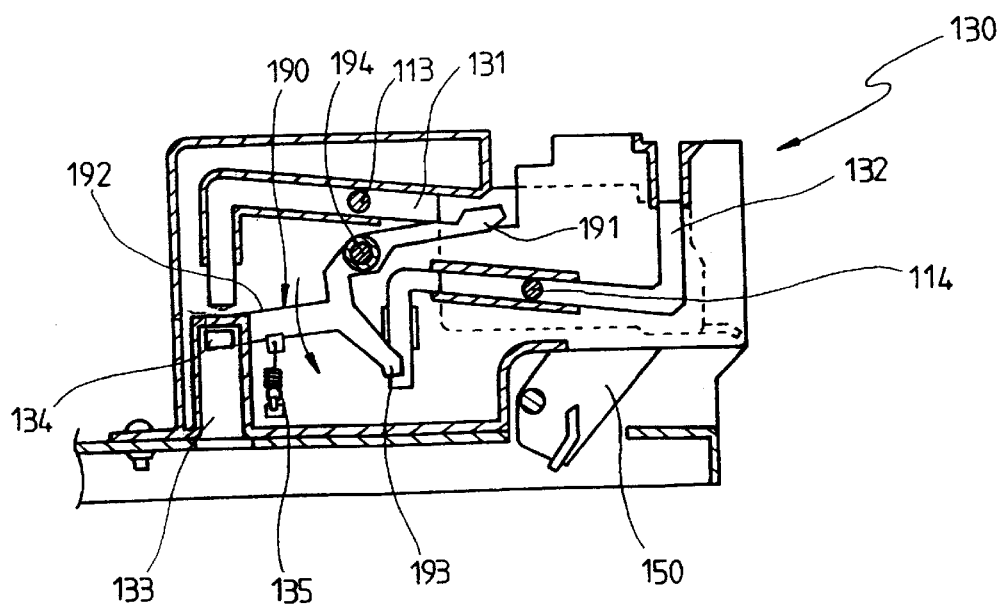
Figure 9:
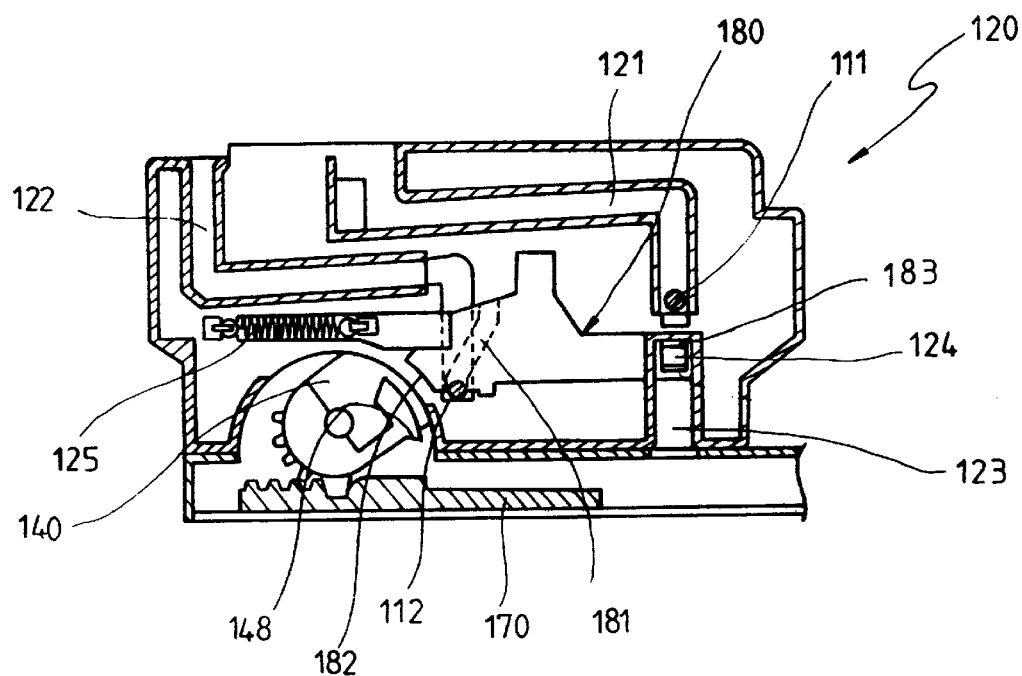
Figure 10:
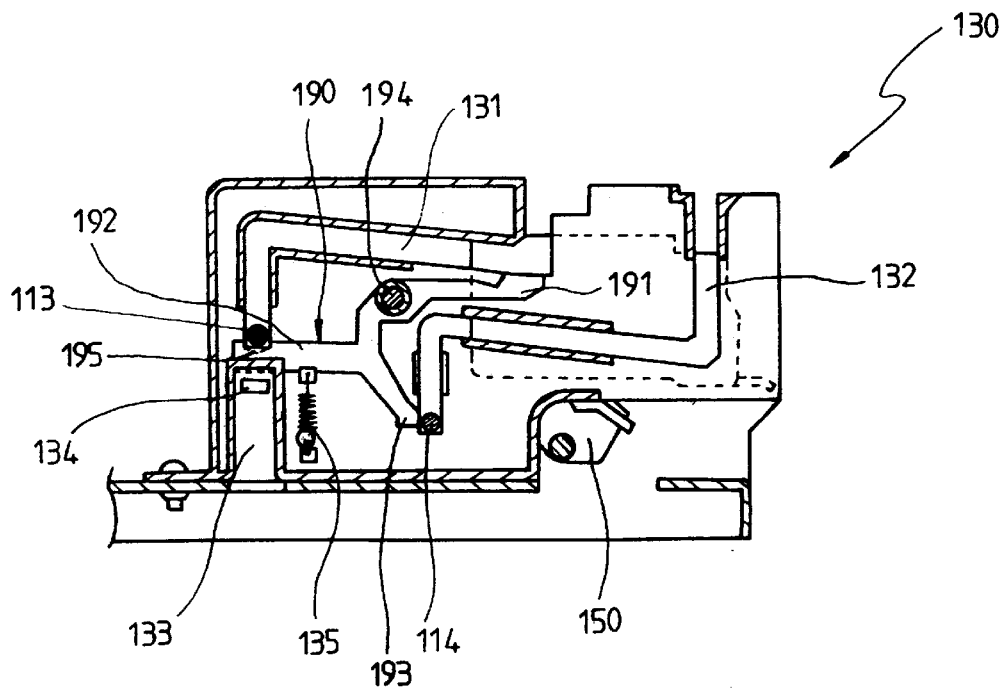

Meanwhile, there is provided initial power applying means for initiating the drive motor 230 when the tape cassette is loaded. The initial power applying means utilizes light emitting/receiving devices for detecting start/end signals of the tape. Referring to FIGS. 1, 3 and 5 to 10, the first guide bracket 120 is shown in FIGS. 5, 7 and 9, and the second guide bracket 130 in FIGS. 6, 8 and 10. Also, FIGS. 5 and 6 show a state where the tape cassette is not received in the holder 110, FIGS. 7 and 8 show a state where the tape cassette is being loaded, and FIGS. 9 and 10 show a loading completion state.

A light emitting device 280 is installed in the center of the deck 200 (FIG. 3). Also, light receiving devices (not shown) are installed in both ends of the deck, respectively.

Referring to FIG. 5, a connector 123 for receiving one light receiving device is formed on the side wall of the first guide bracket 120. Connector 123 has a light shutter hole 124 through which light from the light emitting device 280 passes. A first shutter member 180 for opening/closing the light shutter hole 124 is slidably installed on the side wall of the first guide bracket 120. In the first shutter member 180, there are provided a light blocking portion 184 for blocking the light shutter hole 124 and a light passing hole 183 for allowing light to pass through on one end, and cam 182 which is in contact with a flange 148 of the first arm member 140 on the other end. Also, the first shutter member 180 has an oblique slot 181 into which the guide pin 112 of the holder 110 is guided. First shutter member 180 is connected to the first guide bracket 120 by a spring 125. First shutter member 180 is set into motion by interconnection of first arm member 140 and the guide pin 112, while the first shutter member 180 is restored to its original position by the spring 125.

Referring to FIG. 6, a connector 133 for receiving another light receiving device is formed on the side wall of the second guide bracket 130. Connector 133 has a light shutter hole 134 through which light from the light emitting device 280 passes. Also, a second shutter member 190 is rotatably coupled to the side wall of the second guide bracket 130 by means of a pin 194. Second shutter member 190 has a first lever 191 which contacts/separates from the guide pin 113 of the holder 110, a second lever 192 having an aperture 195 through which the light of the light emitting device 280 passes, and a third lever 193 which contacts/separates from the guide pin 114 of holder 110. Second shutter member 190 is connected to the second guide bracket 130 by a spring 135. Second shutter member 190 is rotated by being in contact with/separated from guide pins 113 and 114 and is restored to its original position by the spring 135. During rotation of second shutter member 190, the light shutter hole 134 is open or closed by the second lever 192.

Thus, when light from the light emitting device 280 passes through the respective light shutter holes 124 and 134 of the first and second guide brackets 120 and 130, the motor 230 does not operate, while when light is blocked, motor 230 operates. As shown in FIGS. 9 and 10, when light shutter holes 124 and 134 of the first and second guide brackets 120 and 130 and the light passing hole 183 and the aperture 195 respectively correspond to each other, the start/end position of the tape can be detected.

As described above, after the tape cassette is completely loaded by the motor 230, the rack gear 251 of main slide member 250 meshes with the pinion 242 of master gear member 240 to allow a sliding motion thereof. At this time, the tape cassette loading means interlocks with the main slide member 250 to then enable its operation.

The configuration of the tape loading means will now be described.

Referring to FIGS. 3 and 17 through 20, guide slots 207 and 208 are formed on the deck 200 adjacent to the head drum 202. A pair of loading gears 260 and 270 mesh with each other beneath the deck 200 between the two guide slots 207 and 208. A sector gear 261 is concentrically formed on the loading gear 260. A slot 252 to which shafts of loading gears 260 and 270 are slidably connected is formed in the main slide member 250. A rack 252a is formed along the length of the slot 252 and meshes with the sector gear 261. Arm members 262 and 272 are integrally formed on the loading gears 260 and 270, respectively. Links 263 and 273 are rotatably connected to the ends of arm members 262 and 272, respectively. Also, slots 263a and 273a are formed towards the other ends of links 263 and 273. Connecting pins 265 and 275 which slide within slots 263a and 273a are formed in pole bases 264 and 274 having guide rollers 266 and 276 for guiding the tape and oblique poles 267 and 277 installed therein (see FIG. 3).

Figure 21:
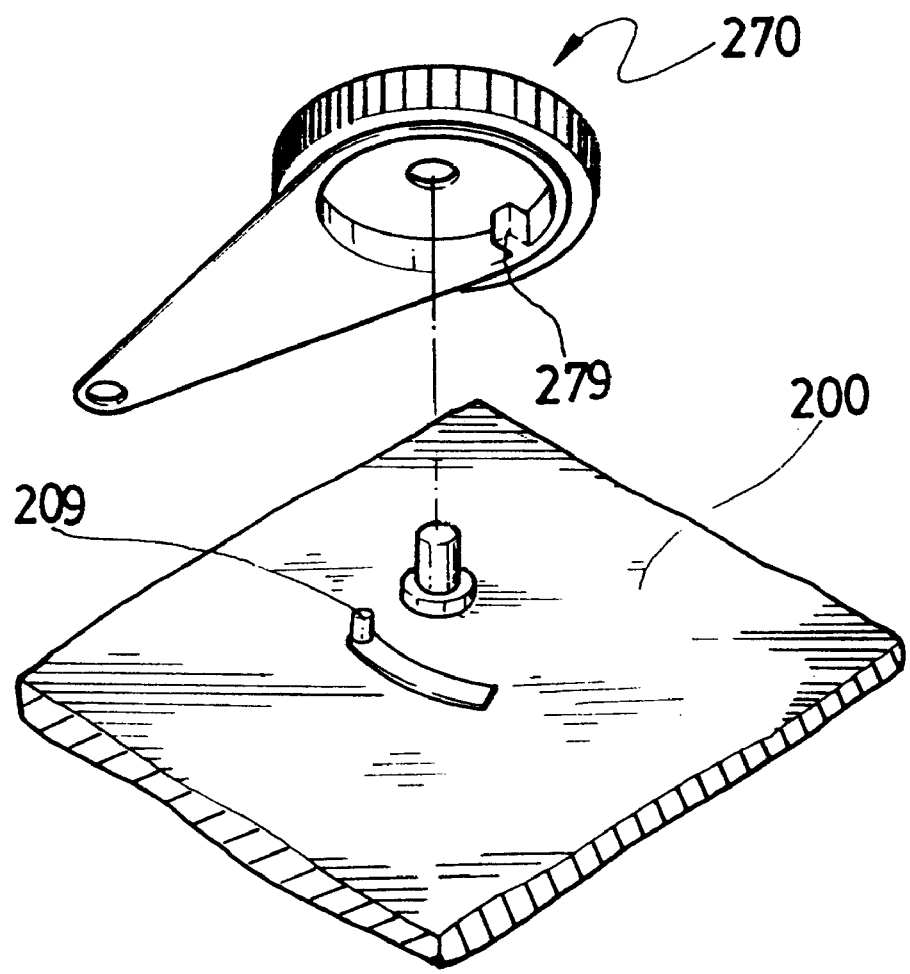
FIG. 21 is a perspective view illustrating a loading gear.

As shown in FIG. 21, a projection 279 is formed in the inner surface of the loading gear 270. A stopper 209 is formed on the deck 200 along the path of movement of the projection 279. Thus, when loading gear 270 rotates, the projection 279 is stopped by stopper 209, thereby preventing excessive rotations of loading gears 260 and 270.

In the aforementioned configuration, if the main slide member 250 slides according to driving of the motor 230, pole bases 264 and 274 can move along with guide slots 207 and 208. At this time, the tape inside the tape cassette is pulled out by the guide rollers 266 and 276 and oblique poles 267 and 277 to then be loaded toward the head drum 202.

In order to prevent the sway of the pole bases 264 and 274 after completing the loading of tape, there is provided elastic bias means. The elastic bias means is structured such that torsion springs 268 and 278 for elastically biasing pole bases 264 and 274 in the loading directions, are installed in the links 263 and 273, respectively. One end of each spring 268 and 278 is fixed on the respective links 263 and 273, the other end thereof is elastically in contact with connecting pins 265 and 275, respectively. The ends of springs 268 and 278 are formed with bent portions 268a and 278a. These bent portions 268a and 278a are latched by projections 263b and 273b formed on the respective links 263 and 273. Thus, pole bases 264 and 274 are more closely contacted with the ends of guide slots 207 and 208.

Meanwhile, after the tape is loaded to the head drum 202 by the tape loading means, the pinch roller 206 is operated by the main slide member 250. Pinch roller 206 presses against capstan motor shaft 205, thereby transferring the tape.

The configuration of means for driving the pinch roller 206 will now be described.

Referring to FIGS. 3 and 22 to 28, a post member 317 is fixed on the deck 200 to the right of the head drum 202. A supporting member 310 for supporting the pinch roller 206 to be rotated is coupled with the post member 317 so that it can be elevated by predetermined elevating means.

Supporting member 310 has a first arm 311 for supporting pinch roller 206 from the top, a second arm 312 having a guide projection 315 formed therein, and a third arm 313.

The elevating means includes a slide block 320 movably supported at one side of the deck 200 and having a sloped slot 321 to which the guide projection 315 of the supporting member 310 is slidably connected, and the main slide member 250 and the motor 230 for moving the slide block 320. A projection 322 is formed beneath the slide block 320 and an elastic piece 323 is formed on the internal surface thereof. Also, a pushing flange 324 which slides on the upper deck 200 is formed at the end of slide block 320. Third arm 313 of the supporting member 310 contacts/separates from the elastic piece 323. An interlocking lever 340 is rotatably installed beneath the deck 200 around a pin 341. A projection 342 is formed at one end of the interlocking lever 340, and a slot 343 is formed at the other end to couple with projection 322 of the slide block 320. Also, a protuberance 344 is formed on the side of the interlocking lever 340. A guide groove 254 into which the projection 342 of interlocking lever 340 is inserted and a projecting shoulder 255 are formed in the main slide member 250. A projected block 256 being in contact with protuberance 344 of the interlocking lever 340 for rotating the interlocking lever 340 counterclockwise is formed on the main slide member 250. Therefore, as the main slide member 250 moves, slide block 320 moves accordingly. At this time, supporting member 310 can ascend and descend according to the movement of slide block 320.

In the meantime, when supporting member 310 ascends, a moving member 370 connected by spring 371 to the deck 200 moves so that supporting member 310 does not sway. Sliding flange 324 of slide block 320 contacts with the moving member 370.

After the pinch roller 206 descends by the elevating means, it is pressed against the capstan motor shaft 205, which will now be described.

A first lever 350 having a projection 352 formed at one end and a slot 353 formed at the other end, and a second lever 360 having a projection 363 formed at one end, and connected to slot 353 and a guide flange 364 formed at the other end, are installed on the deck 200 to rotate around by means of pins 351 and 361. A torsion spring 362 is installed on the second lever 360. A first cam groove 253 with which projection 352 of first lever 350 is coupled is formed in the main slide member 250.

Figure 23:
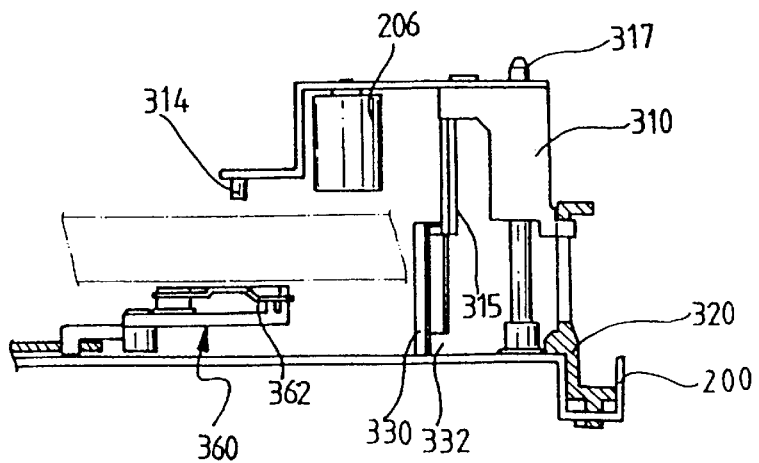
FIG. 23 is a schematic side sectional view of FIG. 22.
Figure 25:
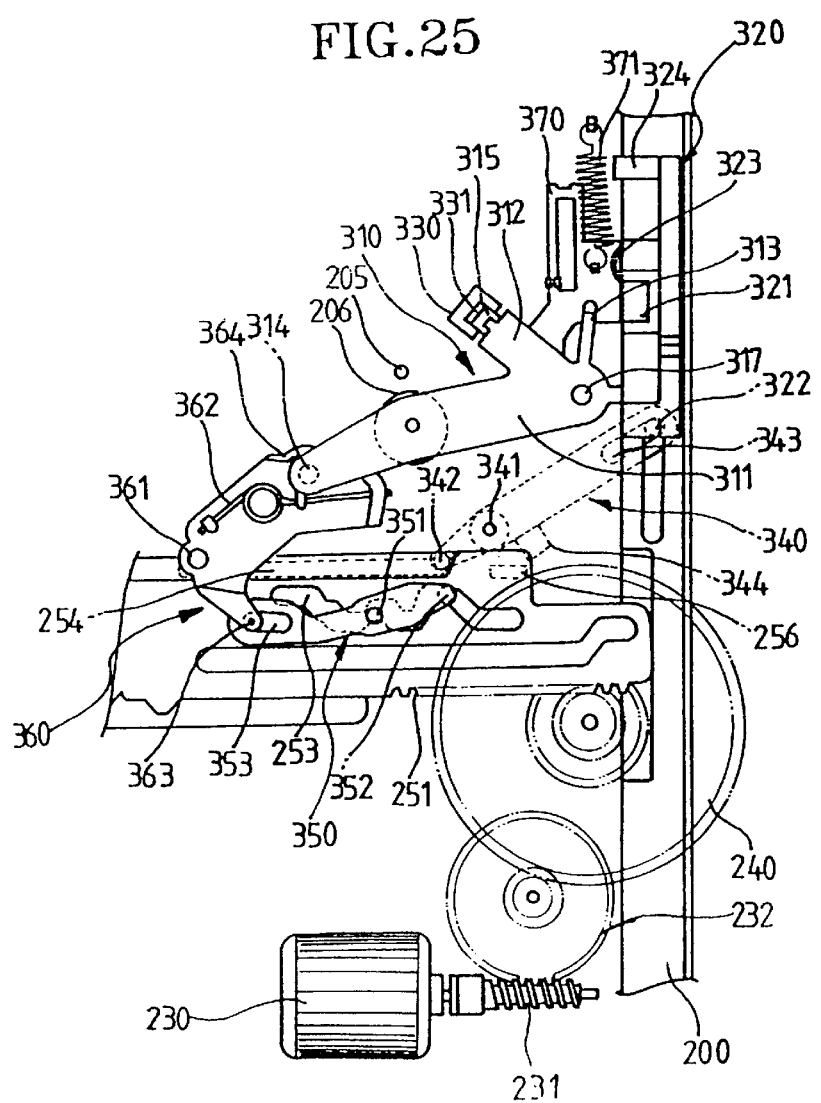
FIG. 25 is a plan view illustrating a lowered state of a pinch roller in a pinch roller driver.

As shown in FIG. 25, when the supporting member 310 descends, a projection 314 of the first arm 311 is positioned between guide flange 364 of the second lever 360 and the torsion spring 362. Therefore, when the main slide member 250 is moved, first lever 350 rotates along the first cam groove 253. At this time, the second lever 360 interlocks with the first lever 360 enabling rotation, and the pinch roller 206 is moved by torsion spring 362 to then be pressed against the capstan motor shaft 205. Meanwhile, a guide block 330 for guiding the support member 310 which either rises or falls is installed on the deck 200. Guide block 330 has a guide groove 331 with which projection 315 of the second arm 312 is slidably connected. As shown in FIG. 23, an aperture 332 from which projection 315 of second arm 312 can be separated is formed at the lower portion of guide block 330. That is to say, aperture 332 allows the rotation of support member 310 so that the pinch roller 206 presses against the capstan motor shaft 205.

A tape transfer means for transferring the tape between the capstan motor shaft 205 and the pinch roller 206 during loading of the tape, is provided being adjacent to the pinch roller 206. The tape transfer means prevents interference between the elevated/lowered pinch roller 206 and the loaded tape.

Referring to FIGS. 3 and 29 through 31, a sector arm 390 having a gear 393 formed on its outer edge is rotatably installed on the deck 200 centered around pin 392. First and second projections 394 and 395 are formed beneath the sector arm 390 so as to protrude below the deck 200. Second projection 395 is shorter than the first projection 394. A review arm 380, having a gear 383 at its one end portion which meshes with the gear 393 of the sector arm 390 and a review pole 381 for guiding the tape at the other end thereof, is rotatably installed on the deck 200 centered around pin 382.

A first guide 257 to which the first projection 394 of sector arm 390 is guided and a second guide 258 on which second projection 395 of sector arm 390 is guided are formed on the main slide member 250. A first sloped wall 257a is formed in first guide 257, and a second sloped wall 258a is formed in the second guide 258. Therefore, if the main slide member 250 moves, first and second projections 394 and 395 of the sector arm 390 respectively interlock with the first and second sloped walls 257a and 258a so as to rotate the sector arm 390 and the review arm 380.

A tension maintaining means which interlocks with the main slide member 250 for maintaining tension in the tape during a play mode is provided between the head drum 202 and the reel-driving table 210. The tension maintaining means will be described with reference to FIGS. 3 and 17. A tension arm 290 having a tension pole 291 (see FIG. 3) and an extension piece 294 extending below the deck 200, formed in both ends thereof, is rotatably installed on the deck 200. A tension band 292 which winds around reel driving table 210 is fixed on the tension arm 290. Tension arm 290 connected to the deck 200 by means of a spring 293 is elastically biased in one direction. An operation lever 296 is rotatably installed under the deck 200 centering around a pin 298. A projection 297 is formed beneath one end of the operation lever 296. The other end of the operation lever 296 always contacts with extension piece 294 of the tension arm 290 elastically. Also, a second cam groove 259 to which projection 297 is coupled is formed in the main slide member 250. Therefore, if the main slide member 250 moves, operation lever 296 rotates accordingly and tension arm 290 interlocked therewith also rotates. A traveling tape is adjusted in its tension according to the rotation angle of tension arm 290.

Figure 33:
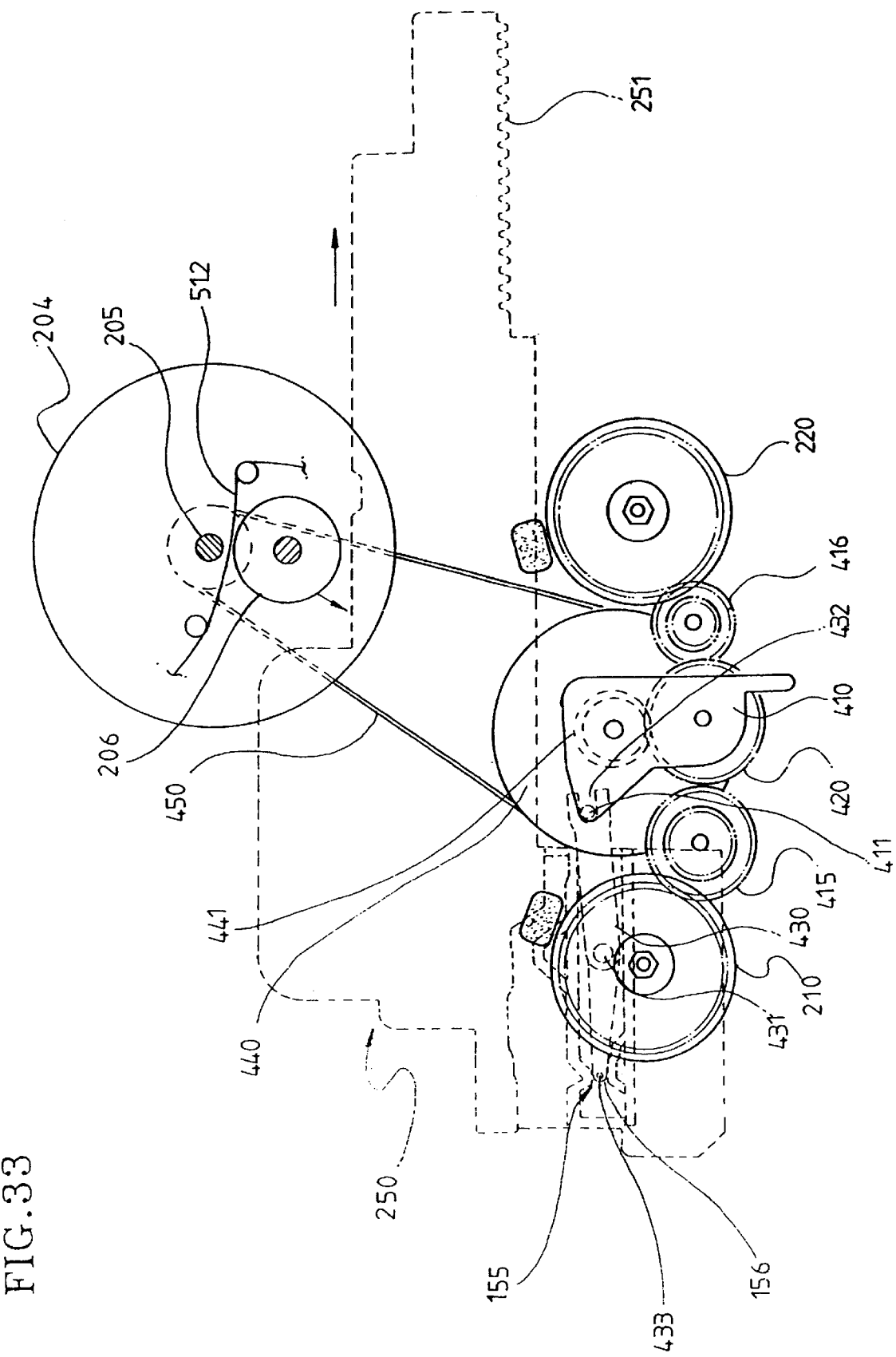
FIG. 33 is a plan view illustrating a reel driver during a stop mode.
Figure 34:
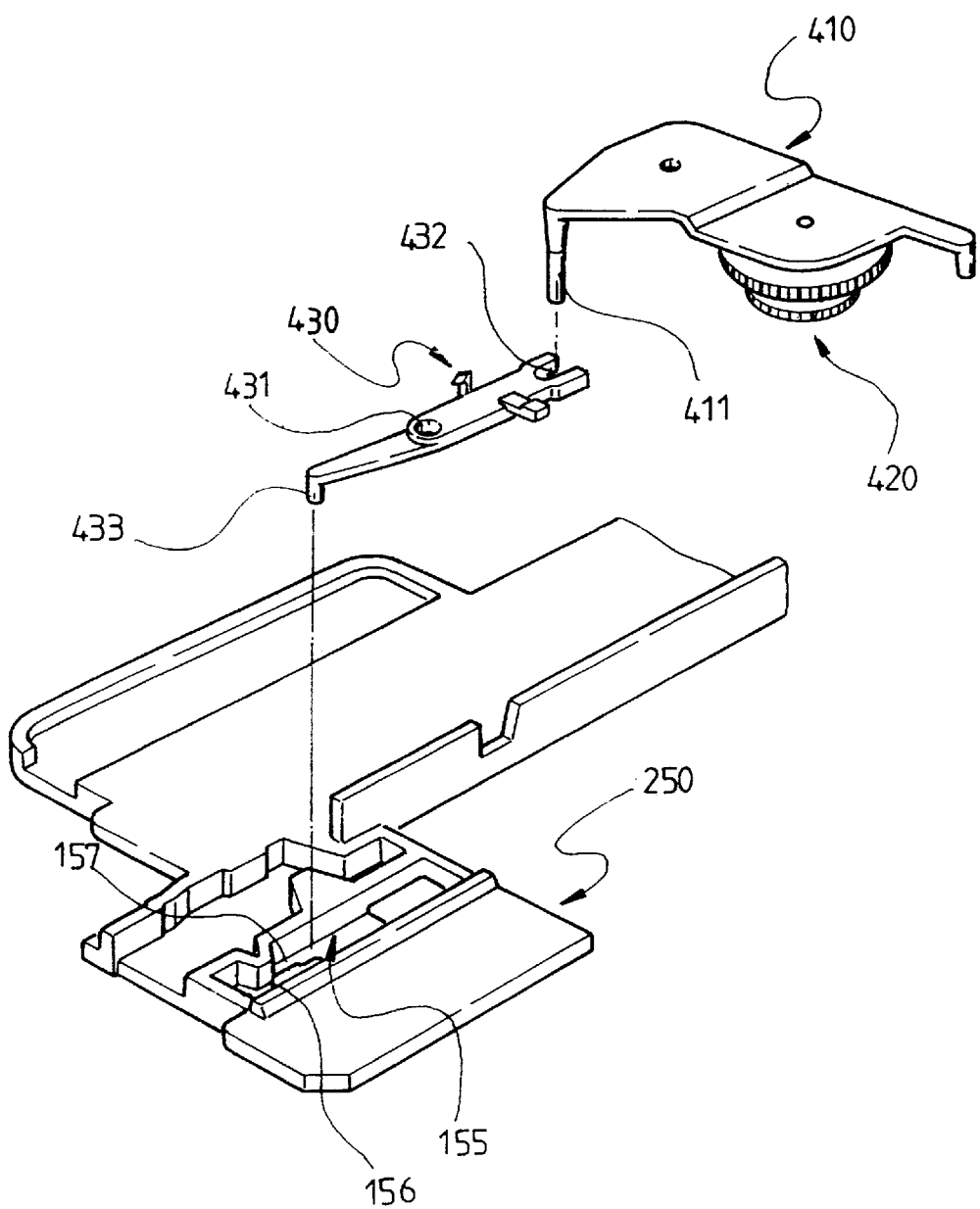
FIG. 34 is an exploded perspective view illustrating a driver of a rotating member for supporting an idler assembly.

The reel driving means for selectively driving the two reel driving tables 210 and 220 will be described with reference to FIGS. 32 through 34. A drive pulley 440 is connected to the capstan motor 204 by a belt 450 between the two reel driving tables 210 and 220. A first transmission gear 441 and a rotation member 410 are coupled at the shaft of drive pulley 440. An idler 420 is installed in the rotation member 410 so as to mesh with the first transmission gear 441. Therefore, the rotation member 410 rotates in the same direction as drive pulley 440 to then selectively engage with either of the two reel driving tables 210 and 220. Here, intermediate gears 415 and 416 are coupled with the respective reel driving tables 210 and 220 for shortening the moving distance of the idler 420.

The separation of the idler 420 from the two reel driving tables 210 and 220 for inhibition of transmission of power from capstan motor 204 thereto will now be described.

An interlocking member 430 having a projection 433 at one end and a connection slot 432 at the other end is rotatably installed beneath the deck 200 centered around pin 431. A projection 411 which slides into the connection slot 432 of interlocking member 430 is formed beneath the rotation member 410.

A third cam groove 155 to which the projection 433 of the interlocking member 430 is coupled is formed in the main slide member 250. Third cam groove 155 has a moving section 157 along which projection 433 moves and a fixing section 156 along which projection 433 does not move. Therefore, when projection 433 is positioned at the moving section 157, the rotation of the rotation member 410 is enabled. However, when the projection 433 is positioned at the fixing section 156, the rotation of rotation member 410 is disabled. That is to say, idler 420 is separated from the respective intermediate gears 415 and 416, as shown in FIG. 33.

FIGS. 35 through 38 show a reel clutch. The reel clutch may convert power from the capstan motor 204 into a large amount of torque which is then transmitted to the reel driving tables 210 and 220 during a low speed mode such as a play mode or a recording mode, and converts the power from the capstan motor 204 into a small amount of torque which is then transmitted to the reel driving tables 210 and 220 during a high speed mode such as a rewind mode or a fast forward mode.

The reel clutch will now be described in detail. Reel gears 211 and 221 are formed on the reel driving tables 210 and 220, respectively. Drive pulley 440 is loosely coupled to a shaft 500 thereof. Also, a friction rotator 460 having a boss 461 (see FIG. 37) passing through the center of drive pulley 440 and frictionally rotating with respect to drive pulley 440, is rotatably coupled to the shaft 500.

A friction member 462 being frictionally in contact with the lower surface of the drive pulley 440 is attached to the upper surface of the friction rotator 460.

A closing boss 490 is fitted on boss 461. First transmission gear 441 rotatably connected to and movable axially to closing boss 490, having first gear 441a formed on its outer circumference, is coupled to closing boss 490. First transmission gear 441 is coupled to closing boss 490 by a first predetermined coupling means.

A first spring 471 for elastically biasing first transmission gear 441 toward closing boss 490 is connected between the first transmission gear 441 and the drive pulley 440, and a second spring 472 is connected between closing boss 490 and drive pulley 440.

Also, there is provided a second transmission gear 480 rotatably connected to the first transmission gear 441, having a second gear 482 on its outer circumference, and capable of elevating together with the first transmission gear 441 by a predetermined pressing means. Second transmission gear 480 is supported by a ring-shaped flange 441c formed in the lower portion of the first transmission gear 441.

Figure 35:
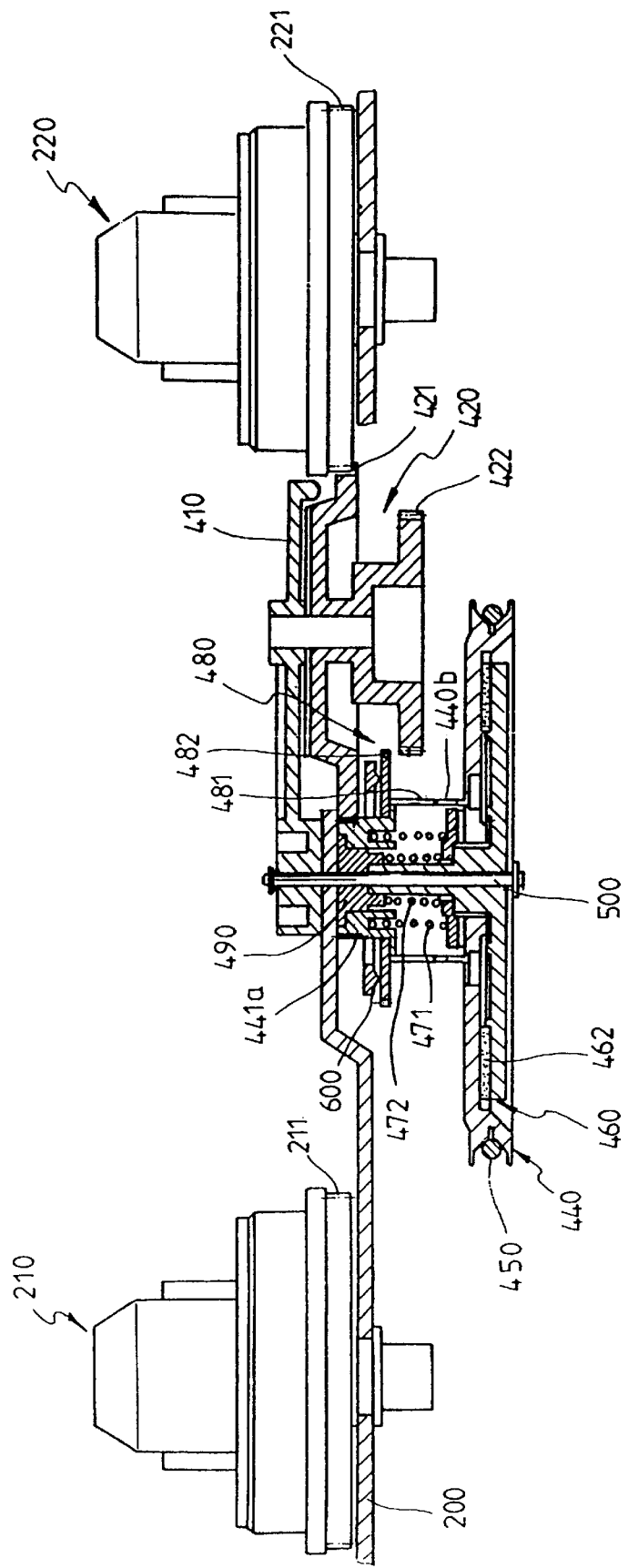
FIG. 35 is a sectional view of a clutch during the play mode.
Figure 36:
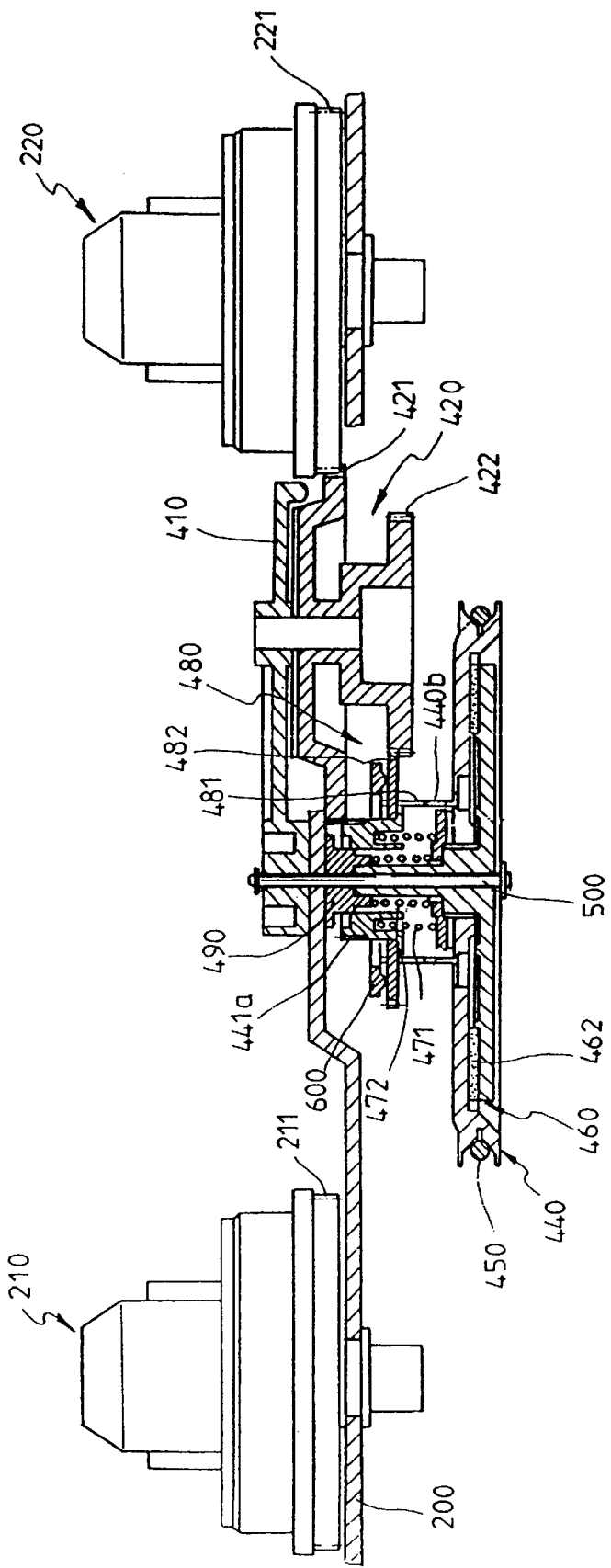
FIG. 36 is a sectional view of a clutch during a fast forward mode.

As shown in FIGS. 35 and 36, a lever 600 which interlocks with the main slide member 250 can be used as the pressing means.

There are also provided a second coupling means for connecting the second transmission gear 480 with the drive pulley 440 so that they rotate together at all times, and a connecting means for selectively connecting the first and second gears 441a and 482 while elevated by the pressing means, with the intermediate gears 415 and 416, respectively, beneath closing boss 490.

The first coupling means for coupling closing boss 490 and first transmission gear 441 will be described. A plurality of coupling ribs 491 which are axially elongated are formed on the outer surface of the closing boss 490 in a predetermined spacing, a plurality of rib grooves 441b to which the plurality of coupling ribs 491 are coupled are formed on the inner surface of the first transmission gear 441, and a flange 492 is formed on the closing boss 490 so that first transmission gear 441 does not deviate.

Figure 37:
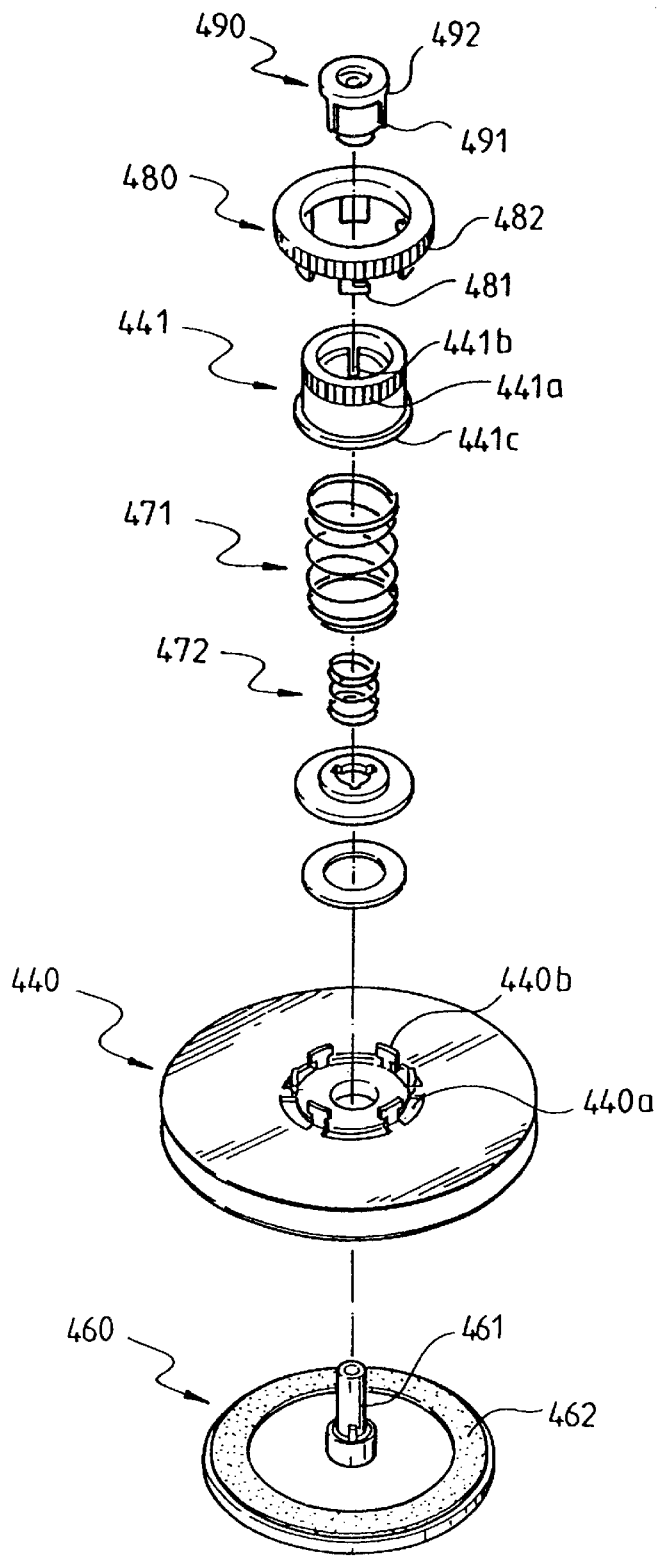
FIG. 37 is an exploded perspective view illustrating a reel clutch.
Figure 38:
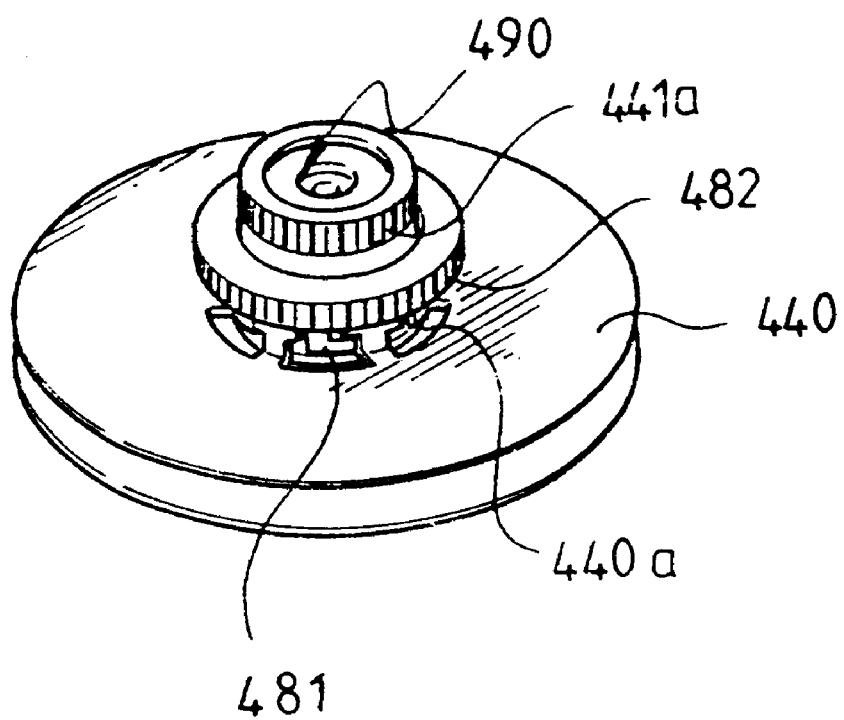
FIG. 38 is an assembled perspective view of the reel clutch in FIG. 37.

Next, the second coupling means for coupling the second transmission gear 480 with the drive pulley 440 will be described. As shown in FIG. 37, a plurality of locking holes 440a and flanges 440b formed between the respective locking holes 440a are intermittently formed in drive pulley 440, forming a concentric circle, and a plurality of lockers 481 interlocked with flanges 440b and accessible to locking holes 440a are formed beneath the second transmission gear 480. Normally, first and second transmission gears 441 and 480 are elastically supported by first spring 471 so that the lockers 481 do not access the locking holes 440a. However, when the second transmission gear 480 is pressed by the pressing means, lockers 481 access the locking holes 440a.

Now, the configuration of the connection means will be described.

First, idler 420 includes a third gear 421 being coupled to first gear 441a all the time, and a fourth gear 422 coaxially installed with third gear 421.

Second transmission gear 480 is movably pressed by the pressing means to then be coupled to fourth gear 422, thereby driving the reel driving tables 210 and 220 by the power of the motor 230. Here, the first gear 441a of the first transmission gear 441 meshes with third gear 421 all the time.

The mode identifying means for identifying the current operation mode and interlocked with the cassette loading means to determine the recording feasibility of the tape will be described.

Figure 17:
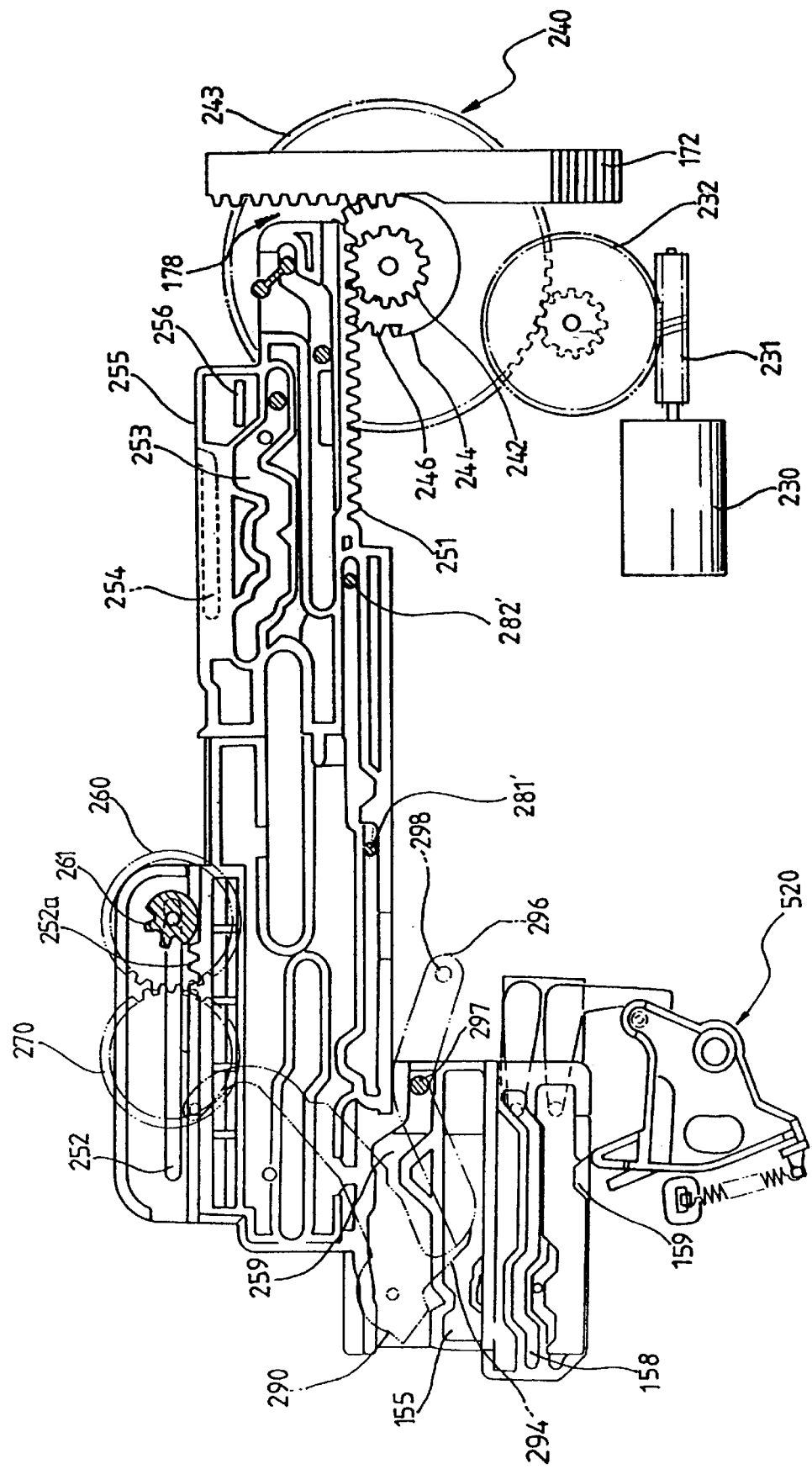
FIG. 17 is a plan view illustrating a main slide member having a plurality of cam grooves formed thereon.
Figure 39:
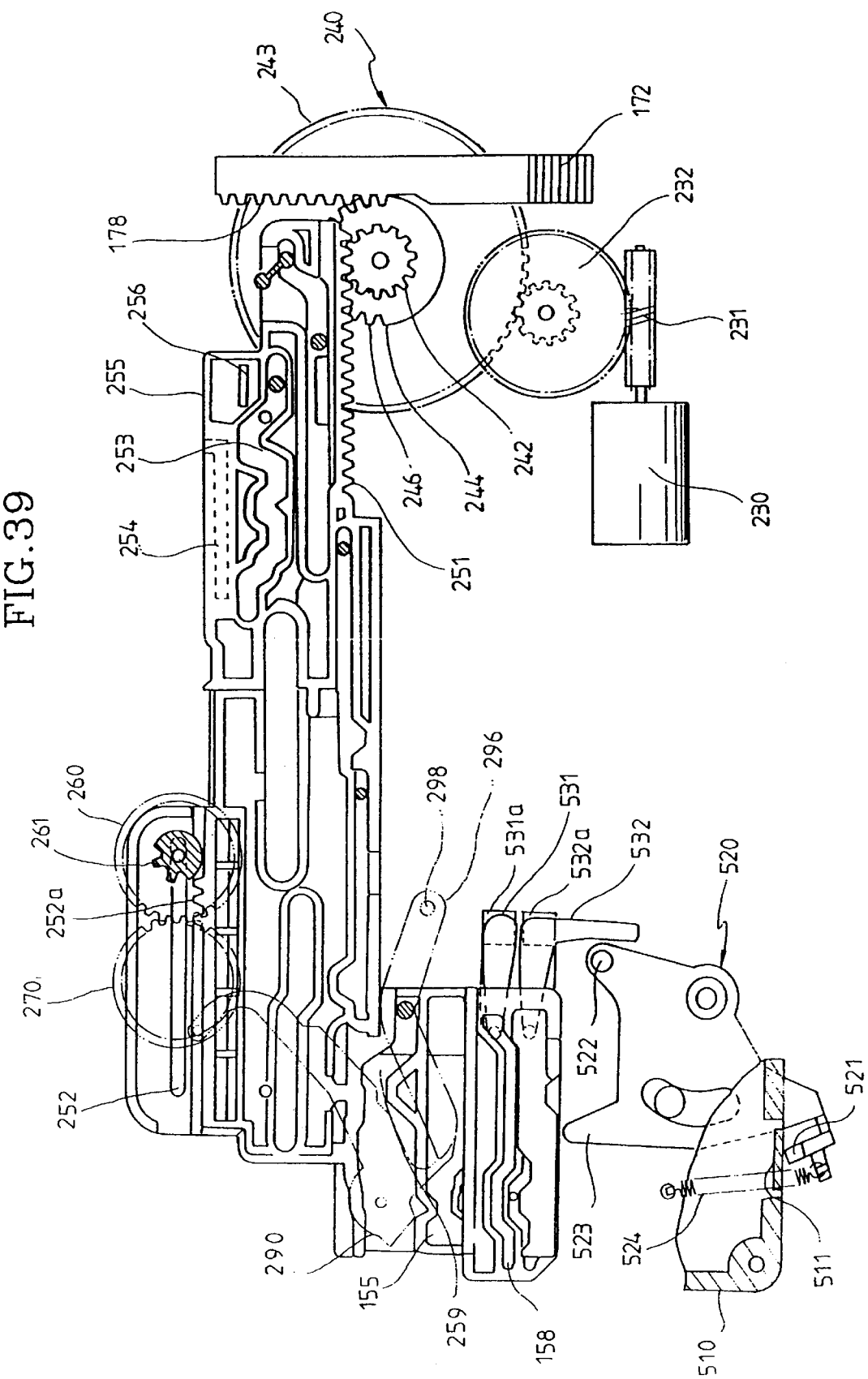
FIG. 39 is a plan view illustrating an operational state of a second switch when a tape cassette, with an erroneous erase preventing piece, is seated.
Figure 40:
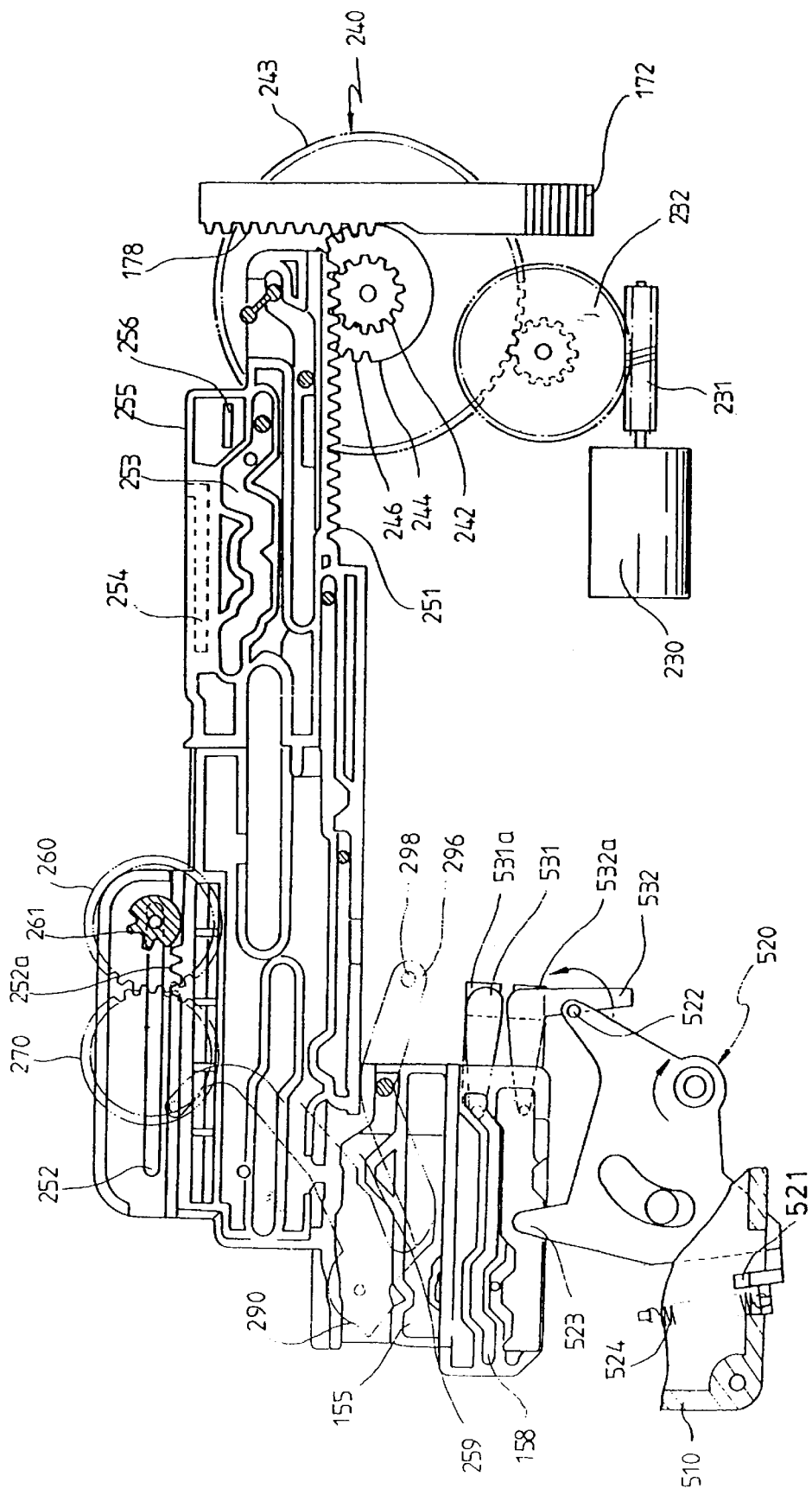
FIG. 40 is a plan view illustrating an operational state of a second switch when a tape cassette, without an erroneous erasure preventing piece, is seated.

Referring to FIGS. 17, 39 and 40, a fourth cam groove 158 of a predetermined shape is formed in the main slide member 250, and an inadvertent erase preventing piece 511 is formed in tape cassette 510. A first switching arm 531 whose one end interlocks with the fourth cam groove 158 to then be rotatable and a first switching device 531a for switching an electrical signal according to the rotation of the first switching arm 531 are provided beneath the deck 200. A second switching arm 532 is rotatably installed adjacent to the first switching arm 531, and a second switching device 532a for switching an electrical signal according to the rotation of the second switching arm 532 is provided.

Also, there is provided a detection lever 520 rotatably installed on the deck 200 and elastically biased in one direction by a spring 524, having a first end 521, and for detecting inadvertent erase preventing piece 511 and a second end 522 rotated depending on the presence or absence of inadvertent erase preventing piece 511 for preventing the unilateral rotation of second switching arm 532, so that the second end 522 may allow the rotation of second switching arm 532 when the first end 521 retreats from the detection position of inadvertent erase preventing piece 511. There is also provided means for controlling an initial position of detection lever 520. The initial position controlling means includes a cam projection 159 (see FIG. 17) formed in the main slide member 250, and a third end 523 formed on the detection lever 520 and interlocked with cam projection 159 so that the rotation of the detection lever 520 is prevented.

According to the mode identifying means having the aforementioned configuration, the first switching arm 531 interlocks with the fourth cam groove 158 to determine an operation mode, as the main slide member 250 moves left and right. Also, depending on the presence or absence of inadvertent erase preventing piece 511, detection lever 520 stops or rotates to interlock with the second switching arm 532.

At this time, as shown in FIG. 39, if inadvertent erase preventing piece 511 is present in tape cassette 510, the detection lever 520 stops so that it does not interlock with the second switching arm 532, thereby enabling the recording of tape. However, as shown in FIG. 40, if the inadvertent erase preventing piece 511 is absent in the tape cassette 510, the detection lever 520 rotates so that it interlocks with the second switching arm 532, thereby preventing the recording of the tape.

Figure 42:
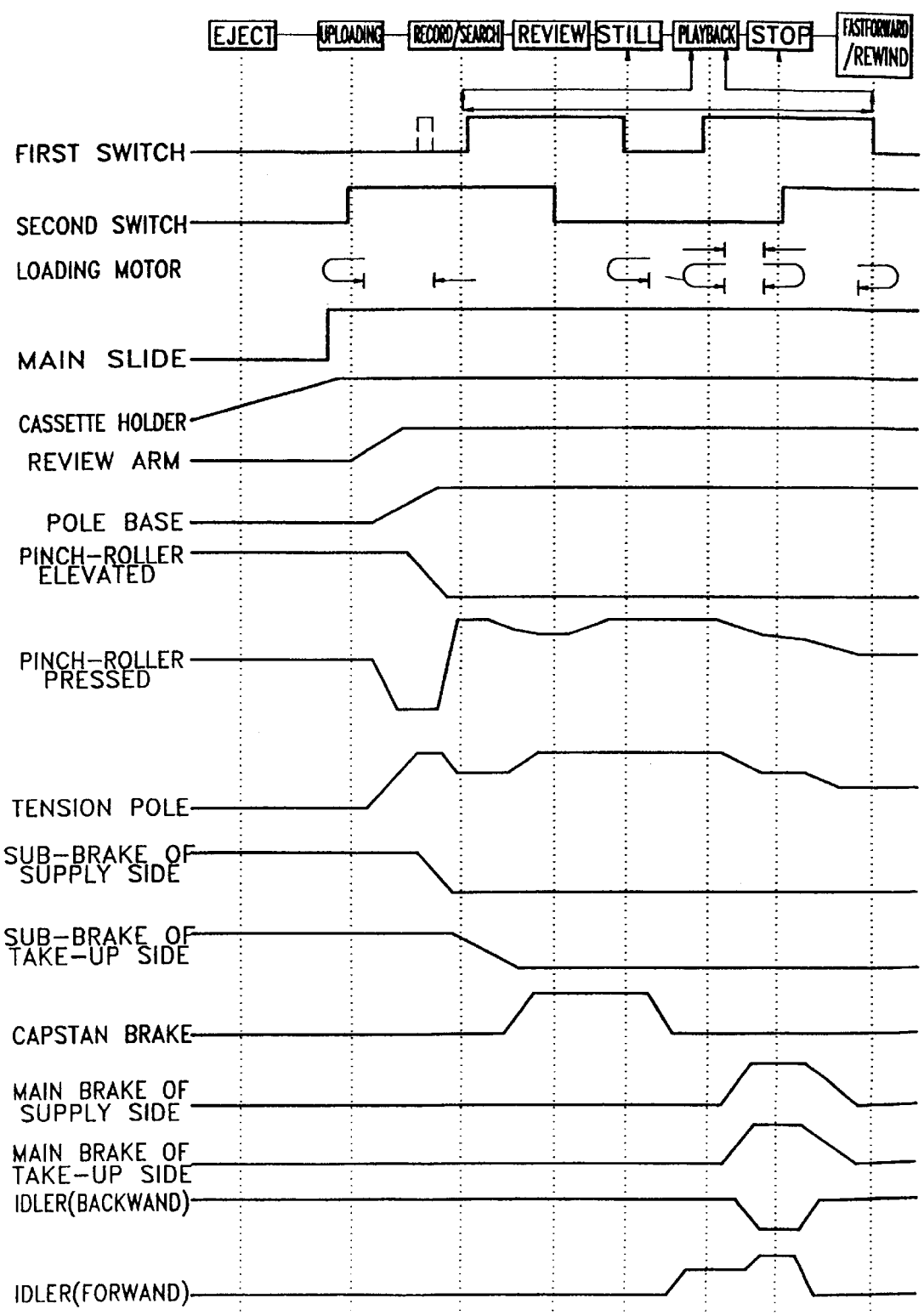
FIG. 42 illustrates operational states of various components depending on the modes.

Meanwhile, referring back to FIG. 4, a brake member 215 is rotatably installed beneath the deck 200 adjacent to the capstan motor 204. Brake member 215 is connected to the deck 200 by a spring 216 so as to press the outer circumference of the capstan motor 204, and interlocks with the main slide member 250. Also, the brake member 215 performs a braking operation during reverse slow mode or still mode, as shown in FIG. 42.

Referring back to FIG. 3, sub-brakes 217 and 218 for performing soft braking operations to frictionally rotate the reel driving tables 210 and 220 are rotatably installed on the deck 200. These sub-brakes 217 and 218 are connected to the deck 200 by means of springs 217a and 218a, respectively. The sub-brake 217 may be installed to interlock with the main slide member 250.

Hereinbelow, the operation of the magnetic recording/reproducing apparatus according to the present invention will be described in detail.

Figure 4:
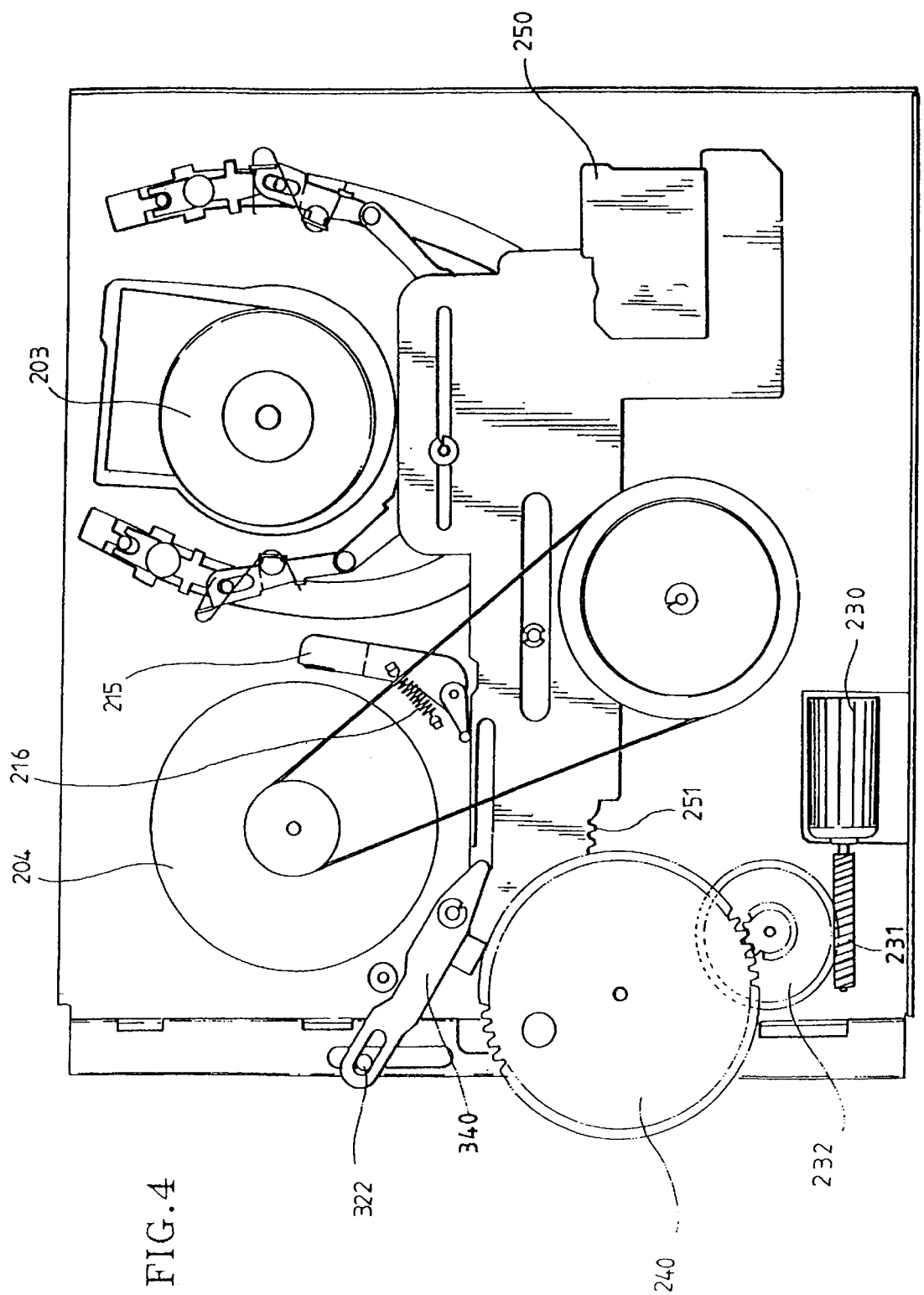
FIG. 4 is a rear view of the deck shown in FIG. 3.
Figure 12:
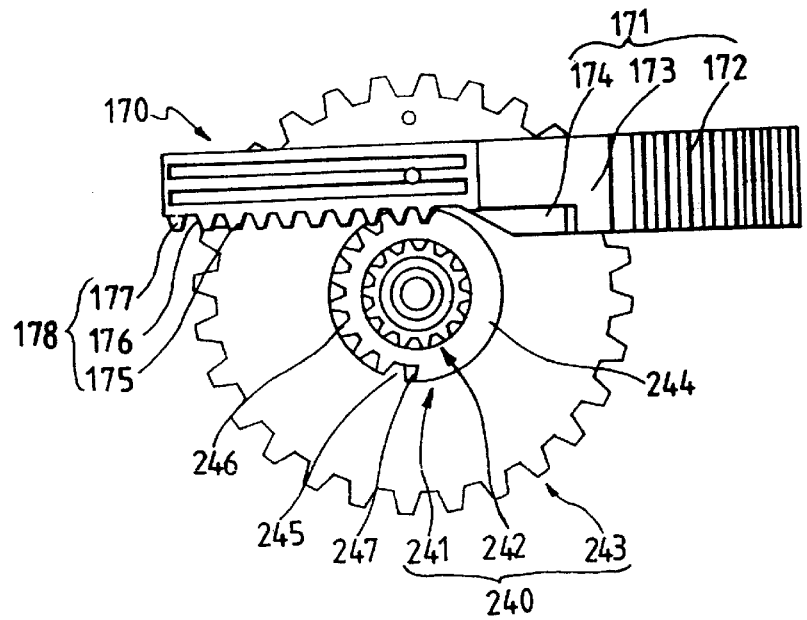
Figure 14:
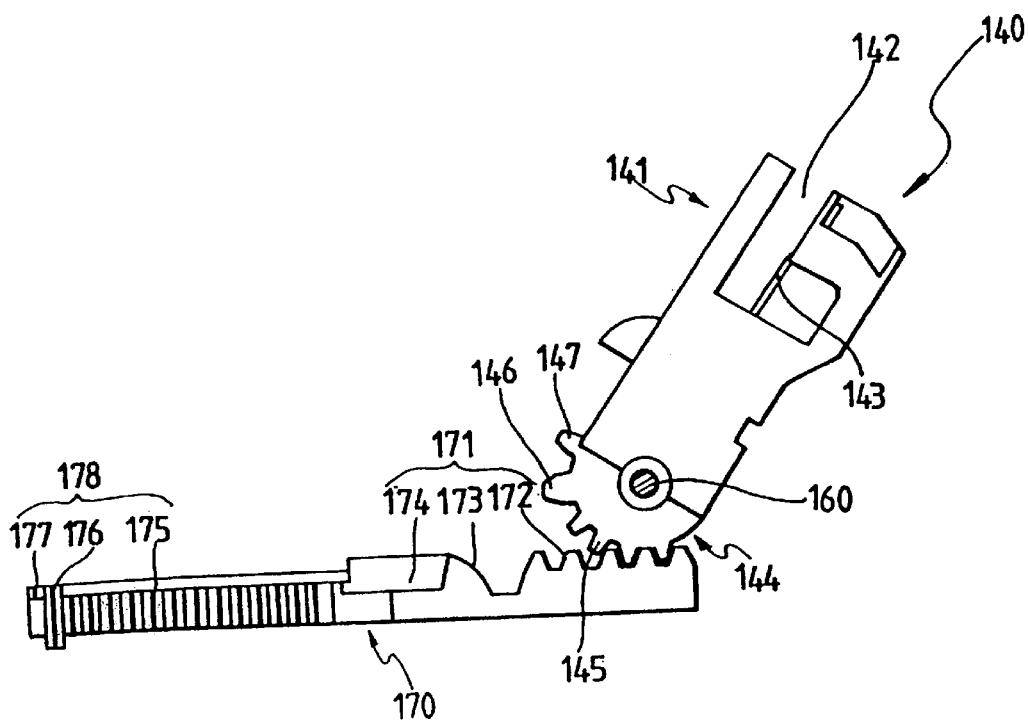

First, the tape cassette loading operation is as follows. As shown in FIGS. 1 and 4, the tape cassette 510 is inserted into the holder 110 of housing 100. At this time, the engagement state of the gear 246 of master gear member 240 and the second rack gear 178 of slide member 170, and that of the first rack gear 171 of slide member 170 and the cam gear 144 of first arm gear member 140 are shown in FIGS. 12 and 14, respectively.

Also, as shown in FIG. 5, the first shutter member 180 is pulled by the spring 125, so that it does not block the light shutter hole 124 of first guide bracket 120. As shown in FIG. 6, the second shutter member 190 is pressed by the guide pin 113 of holder 110, so that it does not block the light shutter hole 134 of second guide bracket 130. Thus, the light of light emission device 280 passes through the light shutter holes 124 and 134 so that the motor 230 does not operate.

In such a state, if the tape cassette 510 is pushed in, first and second shutter members 180 and 190 block shutter holes 124 and 134, respectively, as shown in FIGS. 7 and 8. Power is then applied to the motor 230, thereby rotating the master gear member 240 clockwise. Accordingly, slide member 170 moves and the first and second arm members 140 and 150 rotate, thereby loading the tape cassette 510.

Figure 13:
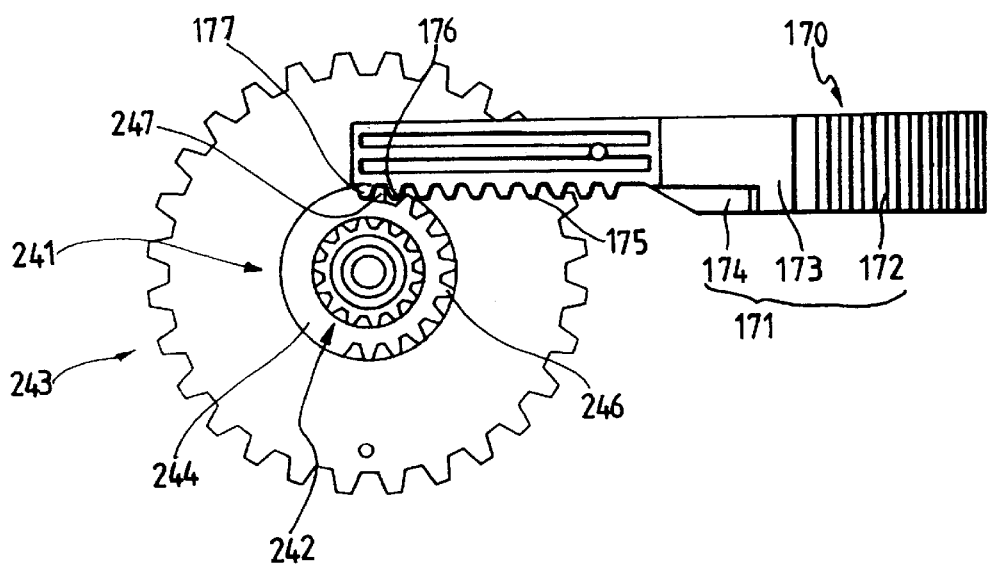
Figure 15:
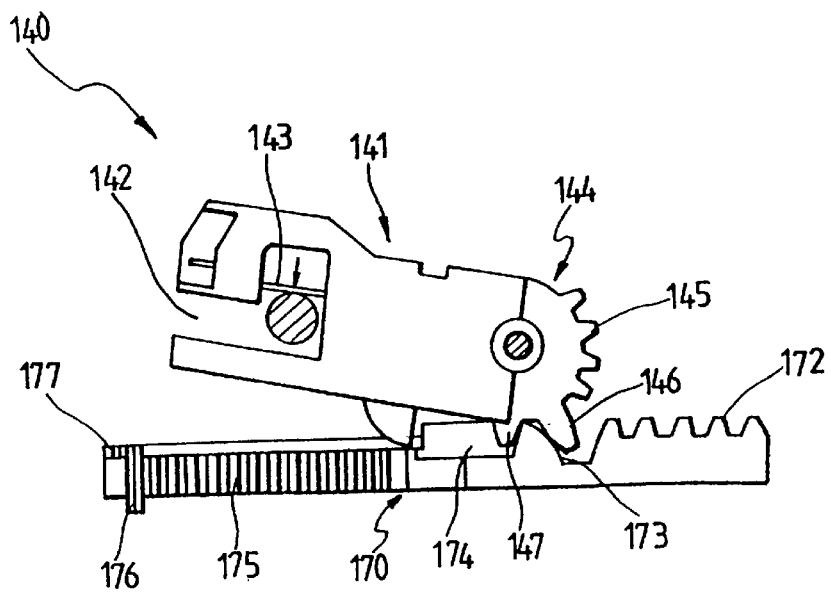

After the loading of tape cassette 510 is completed, the interconnection state of the master gear member 240 and the slide member 170, and that of the slide member 170 and the first arm gear 140 are shown in FIGS. 13 and 15, respectively.

With the tape cassette 510 seated on the two reel driving tables 210 and 220, first and second shutter members 180 and 190 expose the shutter holes 124 and 134 of the first and second guide brackets 120 and 130, respectively, as shown in FIGS. 9 and 10. Accordingly, the light of light emission device 280 passes through the shutter holes 124 and 134 so that the start/end position of the tape can be detected.

The mode identifying and inadvertent erase prevention-operation is as follows.

As shown in FIG. 39, if the tape cassette 510 having inadvertent erase preventing piece 511 is loaded, the first end 521 of detection lever 520 makes contact with inadvertent erase preventing piece 511 so that the detection lever 520 cannot rotate. Accordingly, detection lever 520 does not operate second switch 532a. Therefore, the apparatus operates so as to enable the recording of the tape.

However, as shown in FIG. 40, if the tape cassette 510 without inadvertent erase preventing piece 511 is loaded, detection lever 520 rotates by spring 524 and second end 522 rotates second switching arm 532. Accordingly, the second switch 532a is operated by second switching arm 532, thereby converting the apparatus into a read-only mode.

The tape loading operation is as follows.

Figure 18:
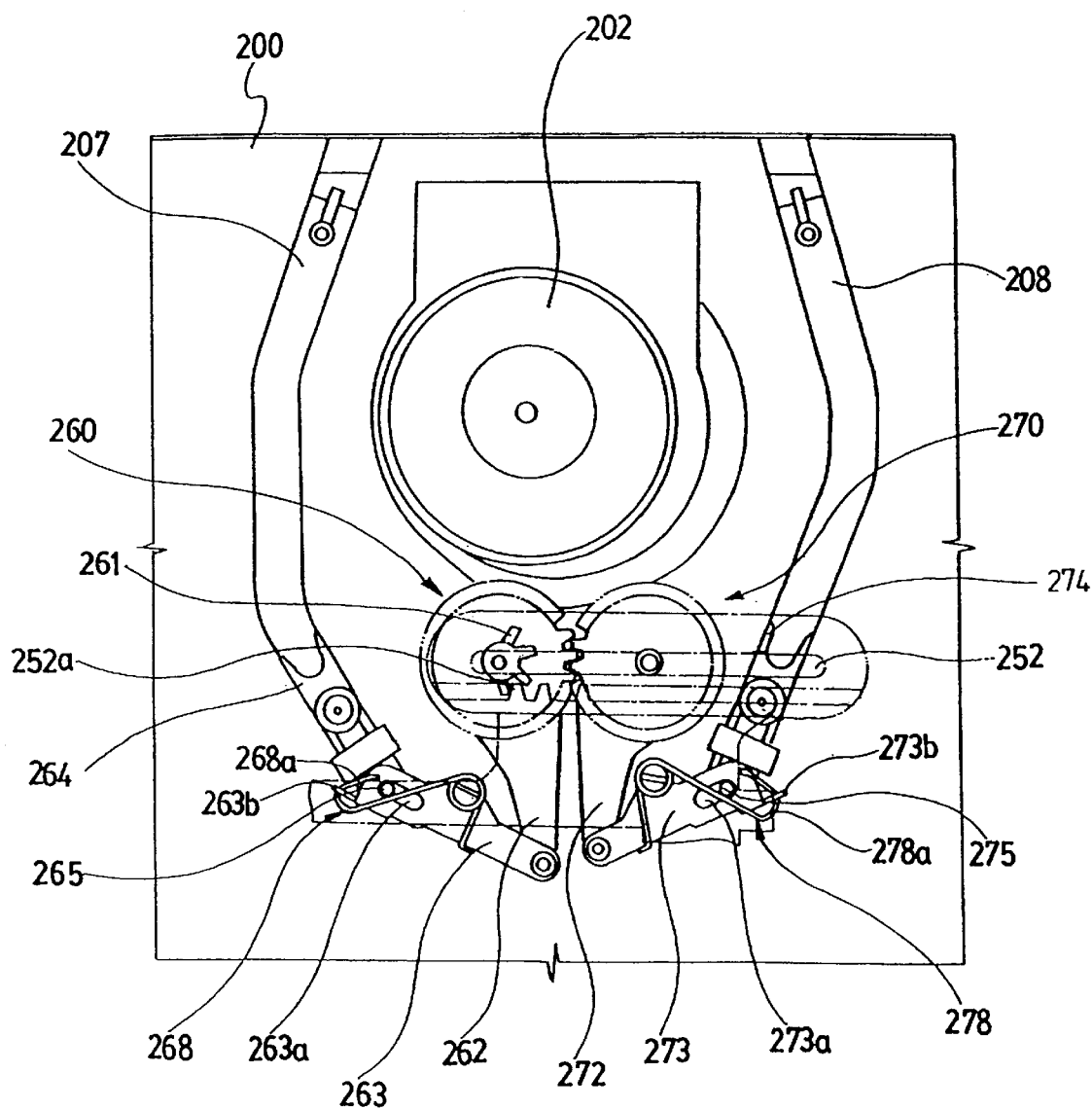
FIGS. 18 and 19 are bottom views illustrating the deck mechanism during loading of a tape.
Figure 19:
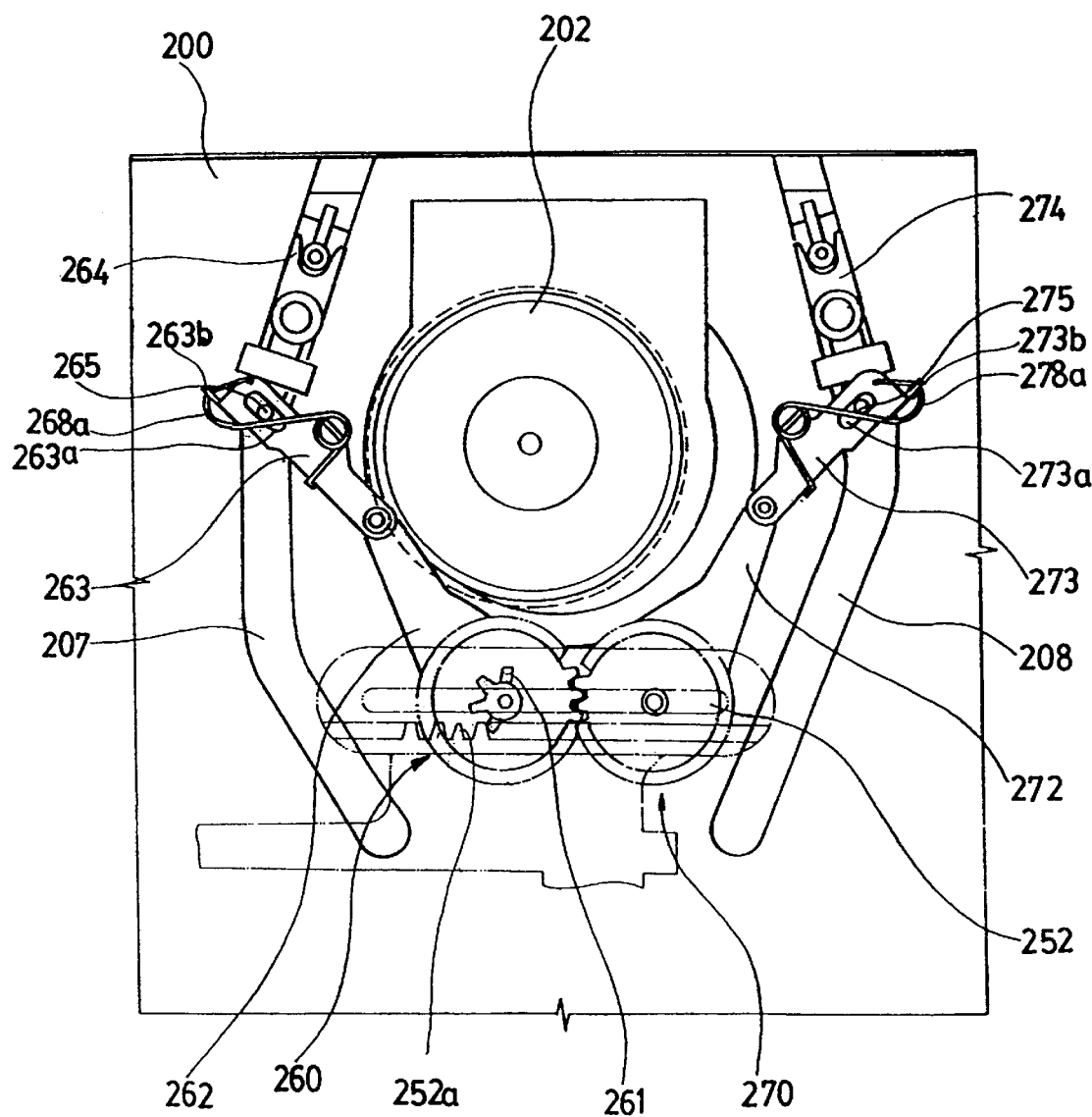

Subsequent to the loading operation of the tape cassette 510, the master gear member 240 rotates clockwise. At this time, as shown in FIG. 16, the control tooth 177 of slide member 170 corresponds to the cam 244 of master gear member 240. Therefore, slide member 170 comes to a standstill in spite of the rotation of master gear member 240. At the same time, since the pinion 242 of the master gear member 240 meshes with rack gear 251 of main slide member 250, the main slide member 250 moves right. When the deck mechanism is viewed from the bottom, its state before tape loading is shown in FIG. 18, and its state after tape loading is shown in FIG. 19. Here, when main slide 250 moves right (left in FIGS. 18 and 19), the sector gear 261 of loading gear 260 meshes with the rack 252a to rotate the pair of loading gears 260 and 270, so that pole bases 264 and 274 move along guide slots 207 and 208. At this time, the tape is loaded toward head drum 202.

Figure 20:
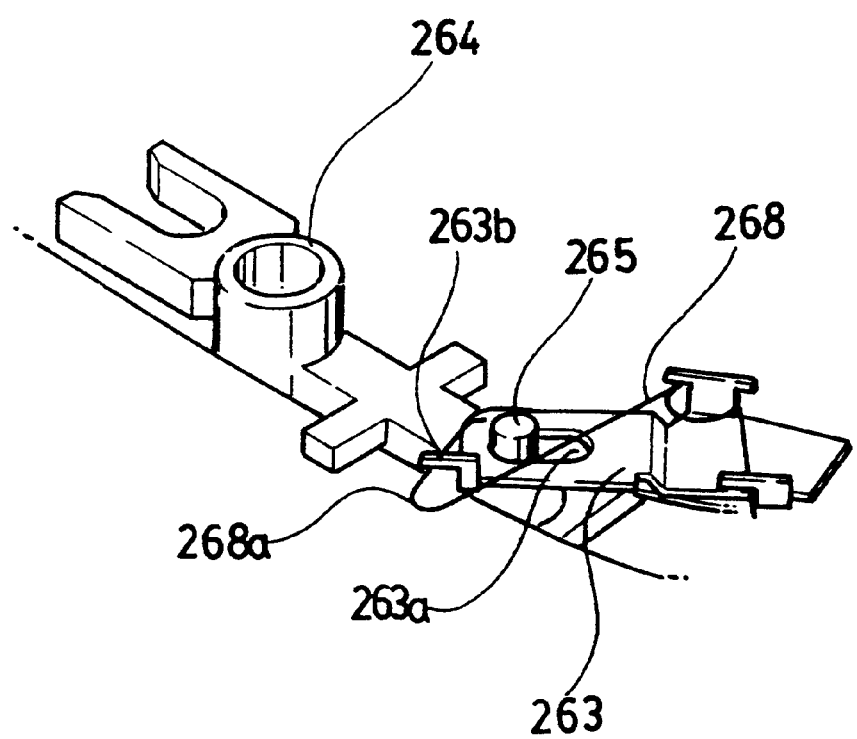
FIG. 20 is a perspective view illustrating a connecting portion of a pole base.

After loading the tape, the pole base 264 is pressed by torsion spring 268 to maintain a stable loading state, as shown in FIG. 20.

As shown in FIG. 21, since projection 279 internally formed in loading gear 270 catches on stopper 209, excessive rotation of the loading gear 270 is prevented.

Meanwhile, the tape tension maintaining operation is performed together with the tape loading operation. That is, as shown in FIGS. 3 and 17, if the main slide member 250 moves right, the projection 297 of operation lever 296 interlocks with second cam groove 259 to then rotate clockwise. At this time, tension arm 290 rotates counterclockwise by spring 293, and tension band 292 tightly contacts the outer circumference of the reel driving table 210. Therefore, during the play mode, the reel driving table 210 is frictionally moved with respect to tension band 292.

The operations of the review pole 381 and the pinch roller 206 are as follows.

Referring to FIGS. 3 and 29 through 31, during the tape loading operation the guide rollers 266 and 276 and oblique poles 267 and 277, installed in pole bases 264 and 274, pull the tape out, and the review arm 380 for maintaining the tension of the tape rotates according to the movement of the main slide member 250. That is to say, as the main slide member 250 moves right, the first and second projections 394 and 395 of the sector arm 390 interlock with first and second guides 257 and 258 of the main slide member 250 to then rotate counterclockwise. Thus, the review arm 380 rotates clockwise and the review pole 381 pulls the tape out. Here, the slope surface 384 (FIG. 31) of review arm 380 is pressed on the projection 372 of the movement member 370 as shown in FIG. 3. Therefore, the review pole 381 maintains stability without shaking, thereby maintaining the tension of the tape uniformly.

Figure 22:
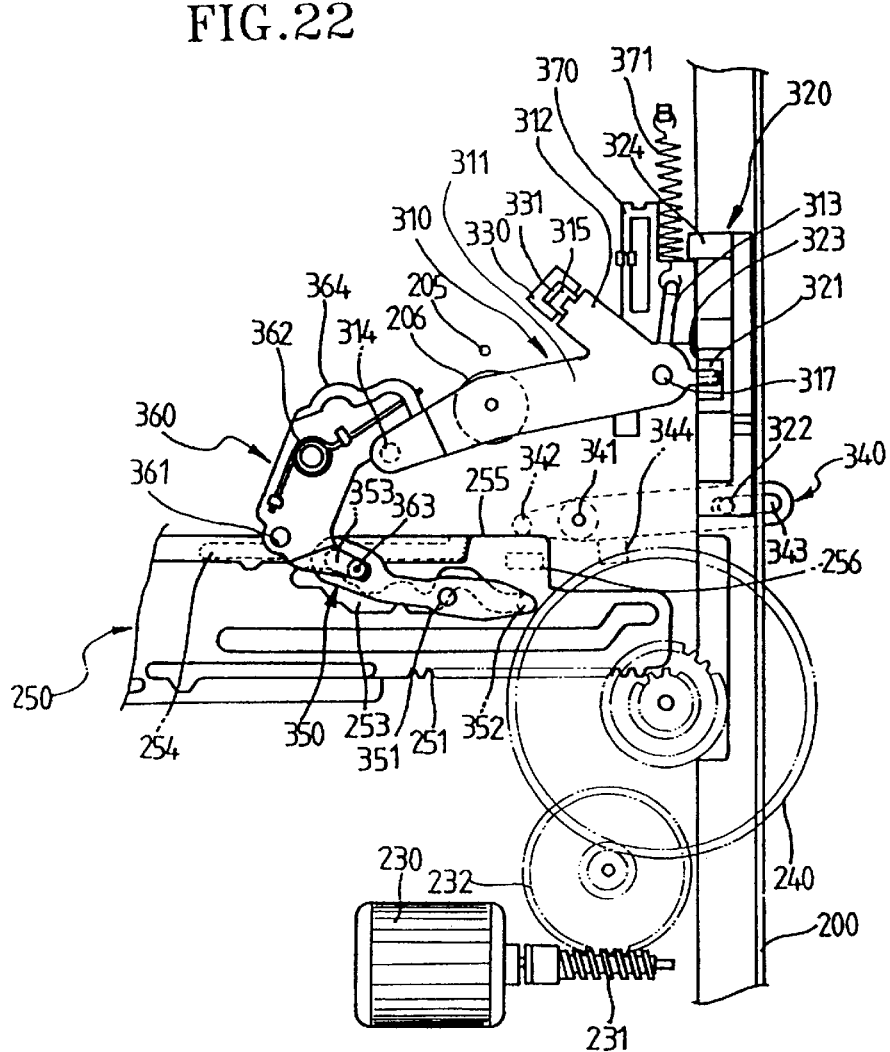
FIG. 22 is a plan view illustrating a lifted state of a pinch roller in a pinch roller driver.
Figure 24:
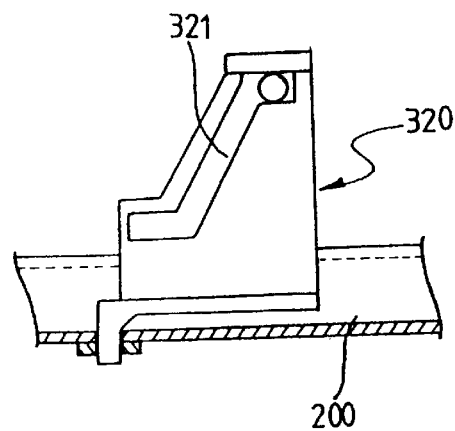
FIG. 24 is a side elevation illustrating the slide block shown in FIGS. 22 and 23.
Figure 26:
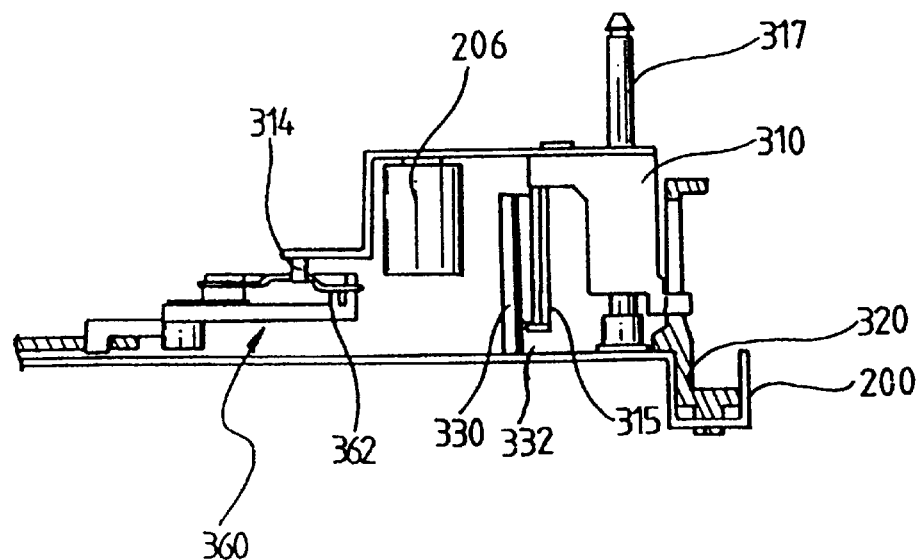
FIG. 26 is a schematic side sectional view of FIG. 25.
Figure 27:
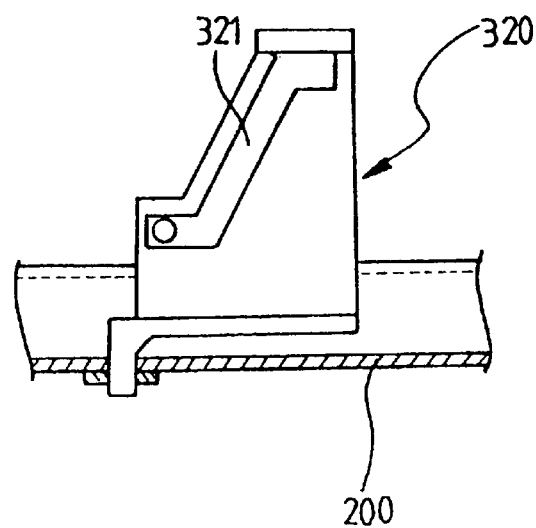
FIG. 27 is a side elevation illustrating the slide block shown in FIGS. 25 and 26.
Figure 28:
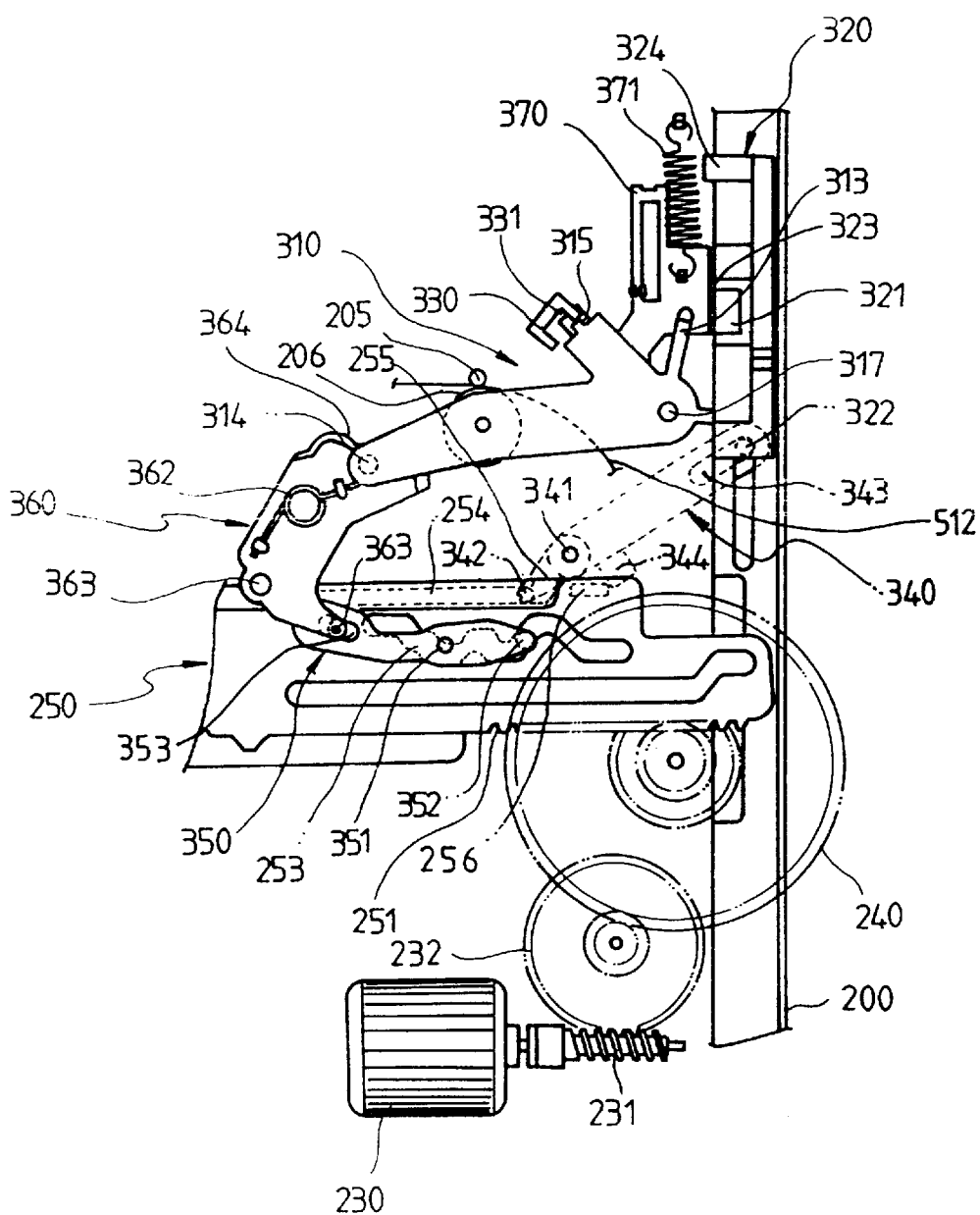
FIG. 28 is a plan view illustrating the state in which the pinch roller is pressed against a capstan motor shaft.
Figure 29:
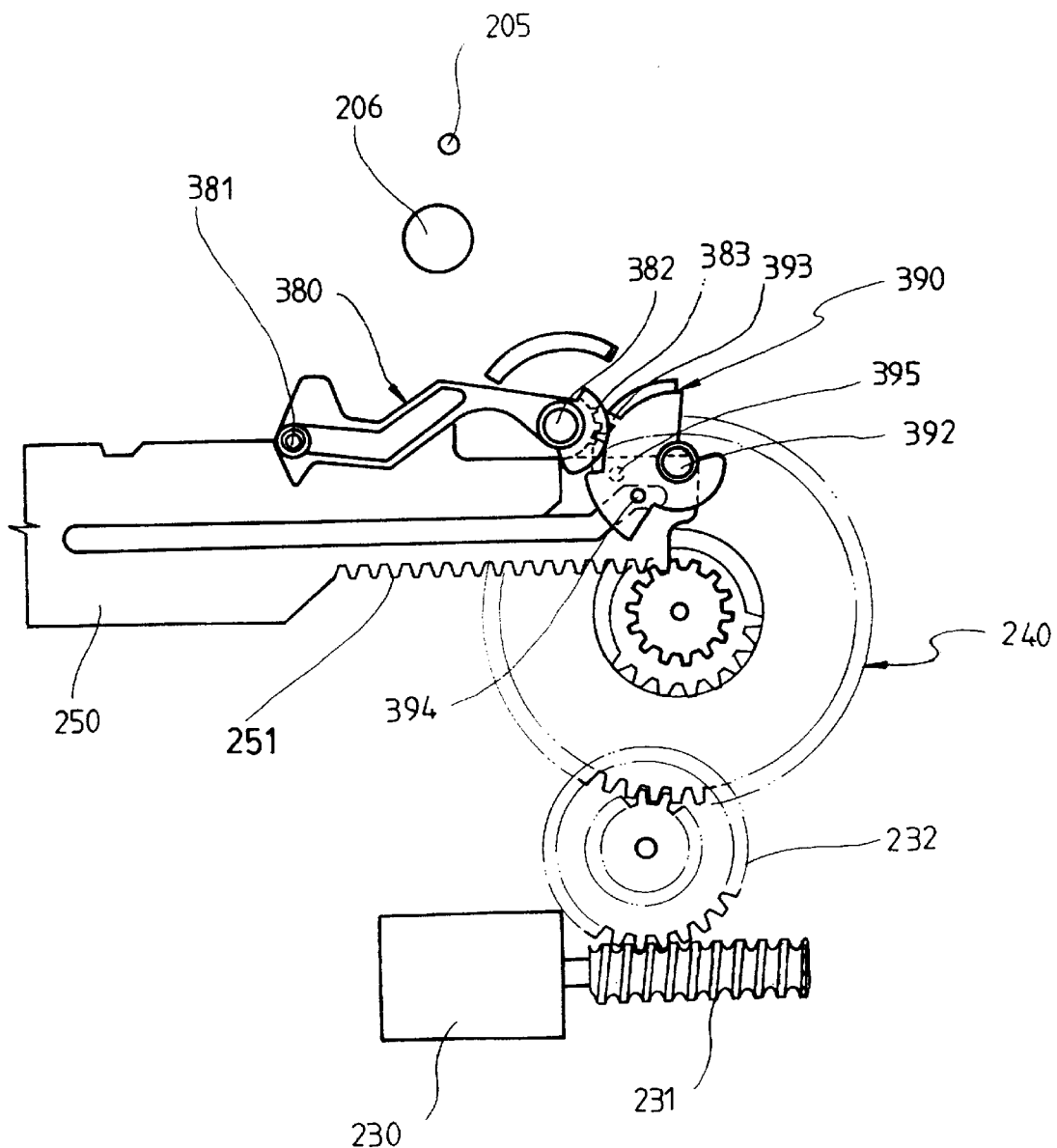
FIG. 29 is a plan view illustrating a review arm before being loaded.
Figure 30:
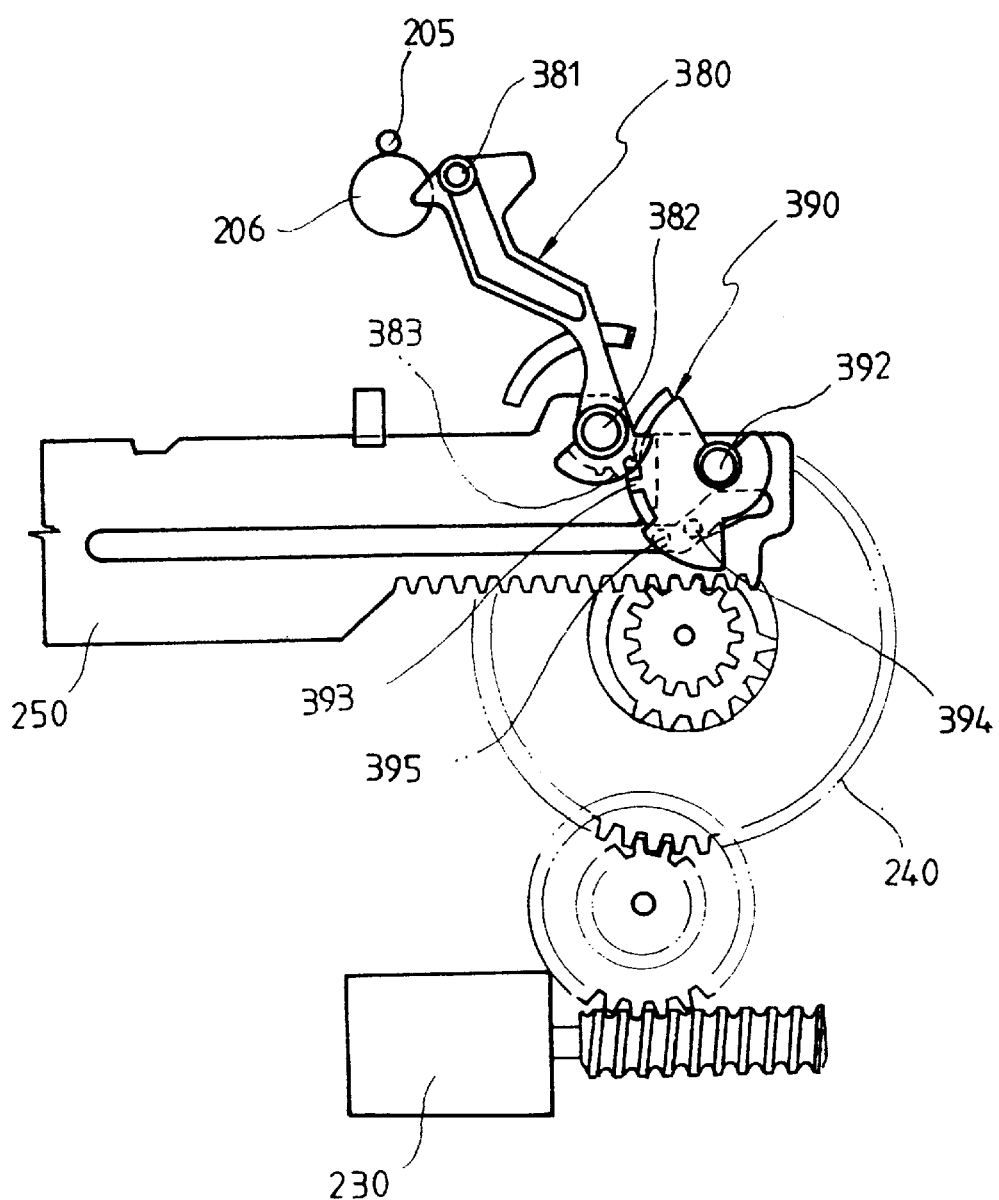
FIG. 30 is a plan view illustrating the review arm after being loaded.
Figure 31:
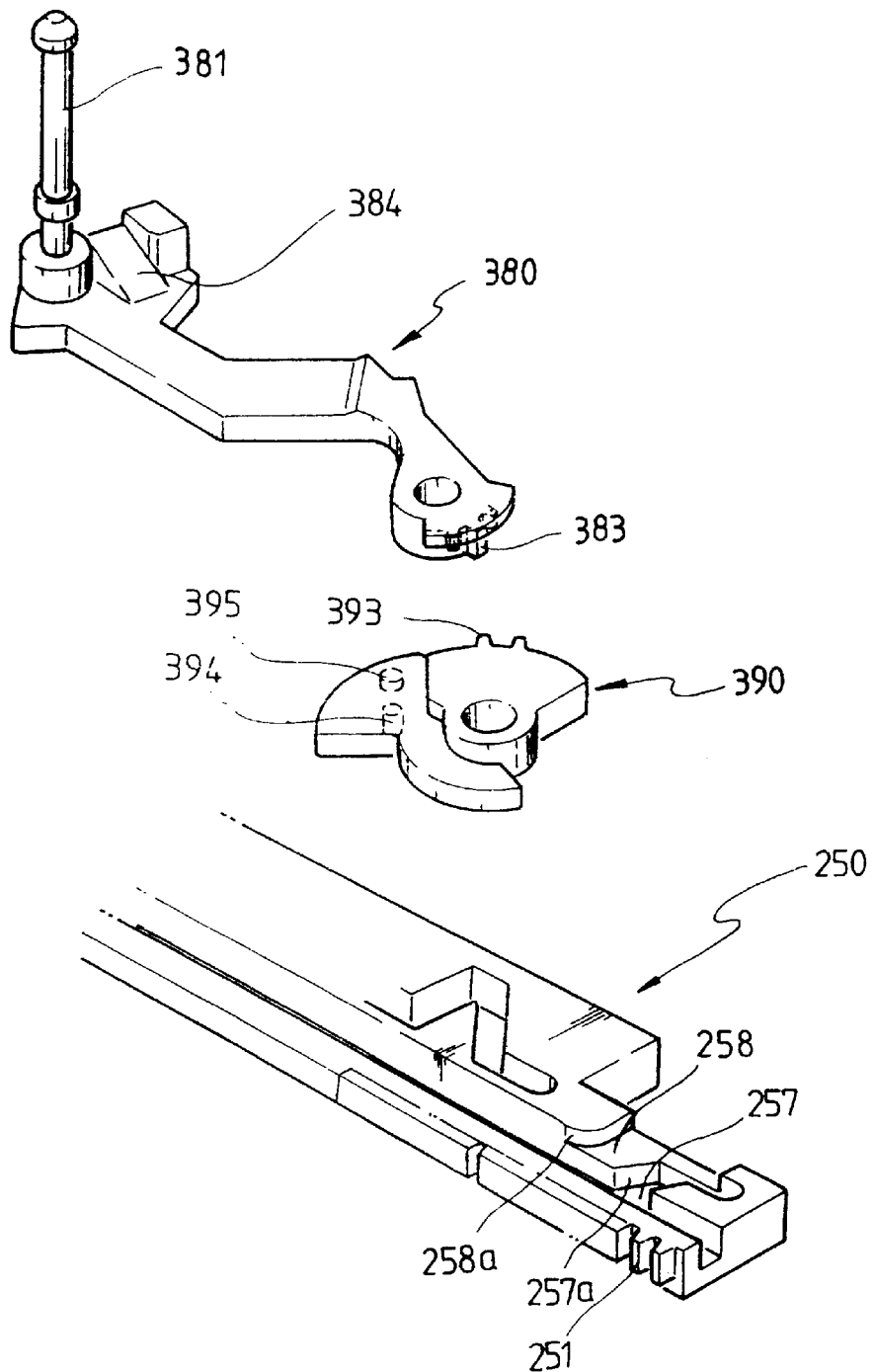
FIG. 31 is an exploded perspective view illustrating a review arm driver.

Immediately after movement of the review arm 380, the pinch roller 206 is pressed against the capstan motor shaft 205. That is, as shown in FIGS. 22 through 24, in the state where the support member 310 for supporting pinch roller 206 ascends, as main slide member 250 moves right, interlocking lever 340 rotates counterclockwise. At this time, slide block 320 interlocks with interlocking lever 340 to then be slidably moved. Support member 310 is guided along a slope slot 321 of slide block 320 to then descend, as shown in FIGS. 25 to 27. Here, projection 314 of support member 310 is positioned between torsion spring 362 and guide flange 364 of second lever 360, as shown in FIG. 25. In such a state, if the main slide moves further right, the first lever 350 rotates clockwise, as the projection 252 thereof interlocks with first cam groove 253 of the main slide member 250, and at the same time the second lever member 360 rotates counterclockwise. Accordingly, supporting member 310 rotates clockwise, and the pinch roller 206 is pressed on the capstan motor shaft 205. At this time, the tape 512 is pressed between the capstan motor shaft 205 and the pinch roller 206, as shown in FIG. 28. In such a state, if the capstan motor 204 is driven, the tape 512 is pressingly transferred.

The operations of the reel driving tables 210 and 220 and the reel clutch are as follows. During the stop mode, as shown in FIG. 33, if the main slide member 250 slightly moves to the right, the projection 433 of interlocking member 430 rotatably supported beneath the deck 200 is inserted into fixing section 156 of the third cam groove 155. At this time, the interlocking member 430 slightly rotates the rotation member 410 for supporting the idler 420. Therefore, idler 420 separates from the two intermediate gears 415 and 416 so that the power of the capstan motor 204 is not transmitted to the two reel driving tables 210 and 220. Meanwhile, the pinch roller 206 is slightly separated from capstan motor shaft 205.

Figure 32:
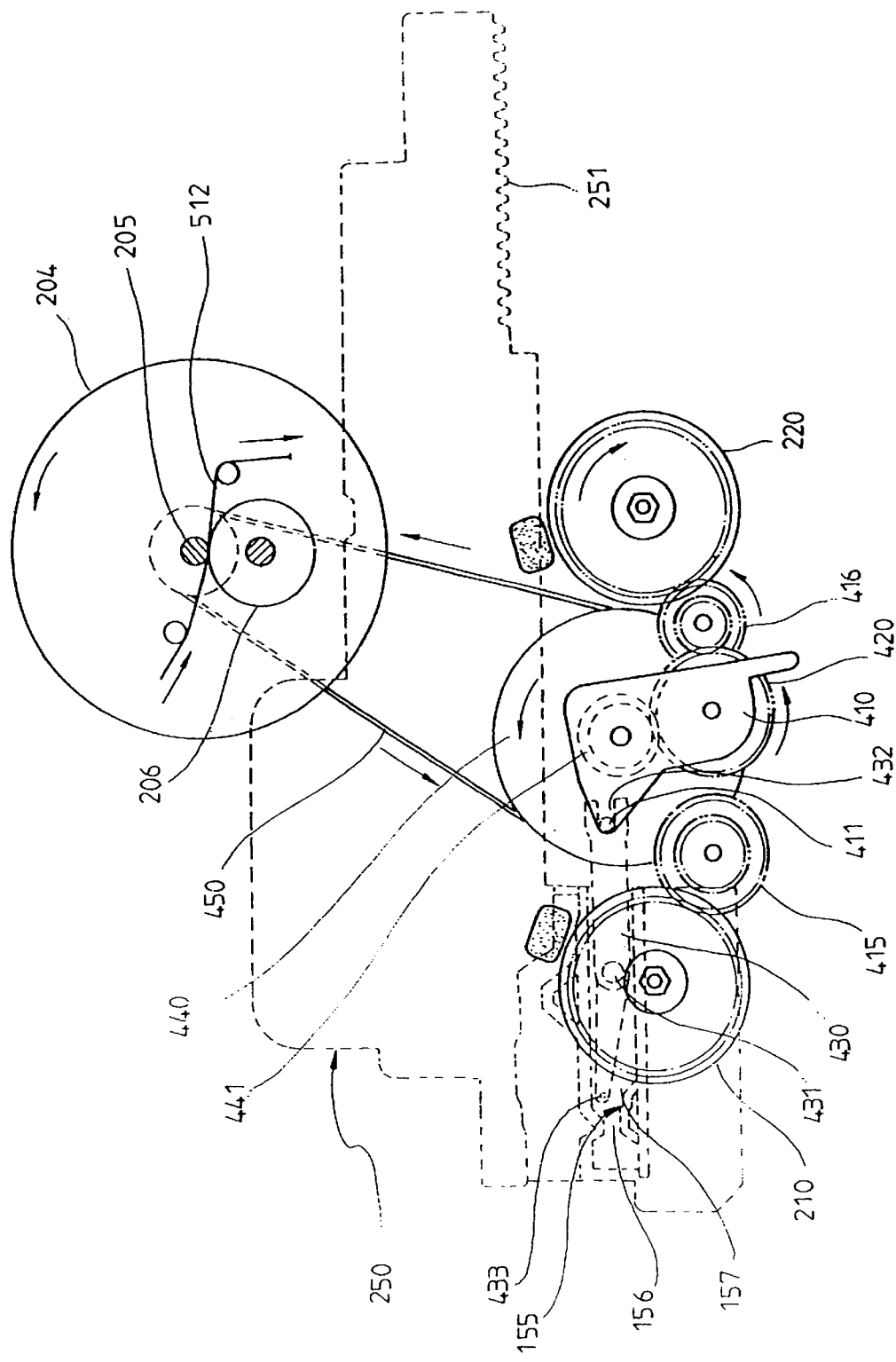
FIG. 32 is a plan view illustrating a reel driver during a play mode.

During the play mode, as shown in FIG. 32, the main slide member 250 moves slightly left. At this time, the projection 433 of interlocking member 430 is positioned in the moving section 157 of the third cam groove 155, so that it can rotate freely. In such a state, if the capstan motor 204 rotates counterclockwise, drive pulley 440 simultaneously rotates counterclockwise. At this time, the rotation member 410 is also rotated according to the counterclockwise rotation of the drive pulley 440, so that idler 420 interlocks with intermediate gear 416. Accordingly, while the reel driving table 220 is rotatably driven clockwise, it winds the tape 512.

Here, during the low speed mode such as the play mode, the reel clutch operates as follows. Referring to FIG. 35, the lever 600 does not interlock with main slide member 250. Therefore, the second gear 482 does not mesh with the fourth gear 422. Accordingly, the reel driving table 220 is rotatably driven by friction with friction member 462.

Meanwhile, during the high speed mode such as the fast forward mode, the reel clutch operates as follows. Referring to FIGS. 36 and 37, if the lever 600 interlocks with the main slide member 250 to then descend, the second gear 482 of second transmission gear 480 meshes with the fourth gear 422, and the locker 481 of second transmission gear 480 couples with the locking groove 440a of drive pulley 440. Accordingly, the reel driving table 220 is rotatably driven by the same power as that of capstan motor 204.

Figure 41:
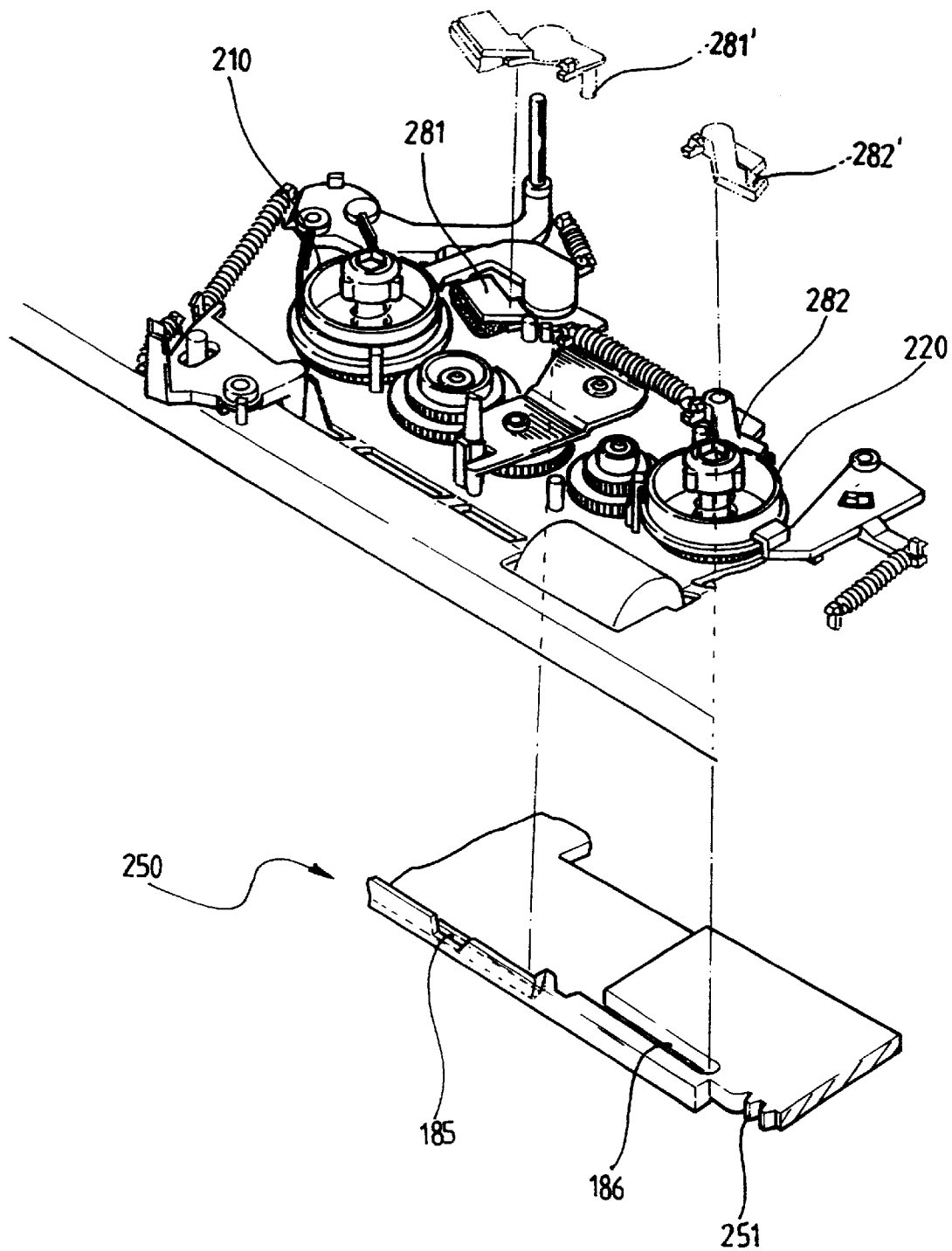
FIG. 41 is an exploded perspective view illustrating a brake of a reel driving table.

As shown in FIGS. 3, 17 and 41, during the stop mode, projections 281' and 282' of first and second brake levers 281 and 282 interlock with the fifth and sixth cam grooves 185 and 186 according to the movement of the main slide member 250, thereby selectively braking the two reel driving tables 210 and 220.

As described above, the magnetic recording/reproducing apparatus according to the present invention has the following advantages.

First, in contrast to the conventional art by which a cassette loading device and a tape loading device are each operated by separate motors, the magnetic recording/reproducing apparatus according to the present invention is driven by a single motor, thereby simplifying the structure thereof.

Second, according to the present invention, since the master gear member 240, the slide member 170 and the main slide member 250 interlock with one another by gear engagements, the movement of various parts of the deck 200 is fast and operation of the apparatus is very stable.

Third, since the first gear 441a of the first transmission gear 441 is always interlocked with third gear 421 of the idler 420, mode conversion is fast.

Fourth, a program switch is eliminated but first and second switching arms 531 and 532 determine the operation mode and recording feasibility, thereby enabling initial mode identification when the power is off.

It will be apparent that the present invention is not limited to the specific embodiments described herein but numerous variations or modifications may be effected.

What is claimed is:

1. A magnetic recording/reproducing apparatus comprising:

a deck including a rotating head drum, a capstan motor having a shaft, and a pinch roller disposed adjacent to said head drum, and two reel driving tables onto which a tape reel of a tape cassette having a tape is seated;

a motor installed in said deck for generating power;

cassette loading means for loading/unloading the tape cassette onto/from said two reel driving tables;

a master gear member rotated by said motor;

a main slide member having a rack gear engaged with said master gear member;

tape loading means, interlocked with said main slide member, for loading the tape of said tape cassette toward said head drum;

pinch roller driving means, interlocked with said main slide member, such that said pinch roller is either one of pressed against and separated from the shaft of said capstan motor, and the tape is pressingly transferred;

reel driving means, interlocked with said main slide member, for selectively driving said two reel driving tables;

brake means, interlocked with said main slide member, for selectively braking said two reel driving tables; and mode identifying means, interlocked with said cassette loading means, for determining a recording feasibility of the tape;

wherein a cam groove of a predetermined shape is formed in said main slide member and an inadvertent erase preventing piece is formed in said tape cassette, and wherein said mode identifying means includes a first switching arm whose first end interlocks and rotates with said cam groove, a first switching device for switching an electrical signal according to the rotation of said first switching arm, a second switching arm rotatably installed on said deck, a second switching device for switching an electrical signal according to the rotation of said second switching arm, a detection lever having a first end rotatably installed on said deck and elastically biased in one direction for detecting said inadvertent erase preventing piece, and a second end rotating depending on the presence or absence of said inadvertent erase preventing piece for preventing a unilateral rotation of said second switching arm, and means for controlling an initial position of said detection lever such that said first end of said detection lever is disposed apart from the detection position of said inadvertent erase preventing piece, so that said second end of said detection lever allows the rotation of said second switching arm.

2. The magnetic recording/reproducing apparatus as claimed in claim 1, wherein said initial position controlling means includes a cam projection formed in said main slide member, and a third end formed on said detection lever interlocking with said cam projection so that the rotation of said detection lever is prevented.

* * * * *